(12) United States Patent
Ishiwatari et al.

(10) Patent No.: US 11,183,679 B2
(45) Date of Patent: Nov. 23, 2021

(54) NEGATIVE ELECTRODE MATERIAL FOR NONAQUEOUS SECONDARY BATTERY, NEGATIVE ELECTRODE FOR NONAQUEOUS SECONDARY BATTERY, AND NONAQUEOUS SECONDARY BATTERY

(71) Applicant: MITSUBISHI CHEMICAL CORPORATION, Chiyoda-ku (JP)

(72) Inventors: Nobuyuki Ishiwatari, Chiyoda-ku (JP); Shunsuke Yamada, Chiyoda-ku (JP); Naoto Maru, Chiyoda-ku (JP); Koji Fukamizu, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 240 days.

(21) Appl. No.: 16/419,713

(22) Filed: May 22, 2019

(65) Prior Publication Data
US 2019/0312257 A1   Oct. 10, 2019

Related U.S. Application Data

(63) Continuation of application No. PCT/JP2017/042109, filed on Nov. 22, 2017.

(30) Foreign Application Priority Data

Nov. 22, 2016   (JP) .............................. JP2016-227261

(51) Int. Cl.

| H01M 4/131 | (2010.01) |
|---|---|
| H01M 4/133 | (2010.01) |
| H01M 4/134 | (2010.01) |
| H01M 4/36 | (2006.01) |
| H01M 4/38 | (2006.01) |
| H01M 4/48 | (2010.01) |
| H01M 4/583 | (2010.01) |
| H01M 4/587 | (2010.01) |
| H01M 4/62 | (2006.01) |
| H01M 10/052 | (2010.01) |
| H01M 10/0525 | (2010.01) |
| H01M 10/0567 | (2010.01) |
| H01M 10/0568 | (2010.01) |
| H01M 4/02 | (2006.01) |

(52) U.S. Cl.
CPC .......... *H01M 4/131* (2013.01); *H01M 4/133* (2013.01); *H01M 4/134* (2013.01); *H01M 4/36* (2013.01); *H01M 4/38* (2013.01); *H01M 4/48* (2013.01); *H01M 4/583* (2013.01); *H01M 4/587* (2013.01); *H01M 4/62* (2013.01); *H01M 10/052* (2013.01); *H01M 10/0525* (2013.01); *H01M 10/0567* (2013.01); *H01M 10/0568* (2013.01); *H01M 2004/021* (2013.01); *H01M 2004/027* (2013.01)

(58) Field of Classification Search
CPC ...... H01M 4/131; H01M 4/133; H01M 4/134; H01M 4/36; H01M 4/38; H01M 4/48; H01M 4/583; H01M 4/587; H01M 4/62; H01M 10/052; H01M 10/0525; H01M 10/0567; H01M 10/0568; H01M 2004/021; H01M 2004/027

See application file for complete search history.

(56) References Cited

U.S. PATENT DOCUMENTS

| 6,627,352 | B1 | 9/2003 | Okochi et al. |
| 6,989,137 | B1 | 1/2006 | Nishimura et al. |
| 2003/0215711 | A1 | 11/2003 | Aramata et al. |
| 2010/0323240 | A1* | 12/2010 | Tsujioka ........... H01M 10/0567 429/199 |
| 2014/0308585 | A1* | 10/2014 | Han ..................... C01B 33/113 429/231.8 |
| 2016/0240843 | A1 | 8/2016 | Kamo et al. |
| 2017/0149100 | A1 | 5/2017 | Ishii |
| 2019/0260011 | A1* | 8/2019 | Ho ..................... H01M 4/1395 |

FOREIGN PATENT DOCUMENTS

| JP | 10-116619 | 5/1998 |
| JP | 2002-246023 | 8/2002 |
| JP | 2004-47404 | 2/2004 |
| JP | 2004-323284 | 11/2004 |
| JP | 2013-200983 | 10/2013 |

(Continued)

OTHER PUBLICATIONS

Marinkovic et al. (Physica status solidi (a) Mar. 16, 1971 pp. 743-754).*

(Continued)

*Primary Examiner* — Milton I Cano
*Assistant Examiner* — Aaron J Greso
(74) *Attorney, Agent, or Firm* — Oblon, McClelland, Maier & Neustadt, L.L.P.

(57) ABSTRACT

Provided are: a negative electrode material for nonaqueous secondary batteries, which has a high capacity and exhibits excellent low-temperature input-output characteristics, charge-discharge rate characteristics, cycle characteristics, and the like; and a negative electrode for nonaqueous secondary batteries and a nonaqueous secondary battery, which include the negative electrode material. The negative electrode material for nonaqueous secondary batteries includes silicon oxide particles (A) and a carbon material (B), wherein the silicon oxide particles (A) contain zero-valent silicon atoms, and the carbon material (B) has a volume resistivity of less than 0.14 Ω·cm at a powder density of 1.1 g/cm$^3$.

12 Claims, No Drawings

(56) References Cited

FOREIGN PATENT DOCUMENTS

| | | |
|---|---|---|
| JP | 2013-200984 | 10/2013 |
| JP | 2015-185491 | 10/2015 |
| JP | 2015-191853 | 11/2015 |
| JP | 2016-152007 | 8/2016 |
| WO | WO 00/22687 A1 | 4/2000 |

OTHER PUBLICATIONS

International Search Report dated Feb. 13, 2018 in PCT/JP2017/042109 filed Nov. 22, 2017.
International Preliminary Report on Patentability and Written Opinion dated Jun. 6, 2019 in PCT/JP2017/042109 (submitting English translation only), 8 pages.

* cited by examiner

NEGATIVE ELECTRODE MATERIAL FOR NONAQUEOUS SECONDARY BATTERY, NEGATIVE ELECTRODE FOR NONAQUEOUS SECONDARY BATTERY, AND NONAQUEOUS SECONDARY BATTERY

CROSS-REFERENCE TO RELATED APPLICATION

This is a continuation of International Application PCT/JP2017/042109, filed on Nov. 22, 2017, and designated the U.S., and claims priority from Japanese Patent Application 2016-227261 which was filed on Nov. 22, 2016, the entire contents of which are incorporated herein by reference.

TECHNICAL FIELD

The present invention relates to: a negative electrode material for nonaqueous secondary batteries; a negative electrode for nonaqueous secondary batteries, which uses the same; and a nonaqueous secondary battery including the negative electrode.

BACKGROUND ART

In recent years, there is an increasing demand for high-capacity secondary batteries in association with size reduction in electronic appliances. Nonaqueous secondary batteries having higher energy density and superior rapid charge-discharge characteristics as compared to nickel-cadmium batteries and nickel-hydrogen batteries, particularly lithium ion secondary batteries, have been drawing attention. Especially, nonaqueous lithium secondary batteries, which include positive and negative electrodes capable of receiving and releasing lithium ions and a nonaqueous electrolyte solution containing a lithium salt dissolved therein, such as $LiPF_6$ or $LiBF_4$, have been developed and put into practical use.

Various materials have been proposed as negative electrode materials of such nonaqueous lithium secondary batteries, and negative electrode materials containing a carbon material are widely used at present. Meanwhile, for drastic performance improvement from the standpoint of attaining a high capacity, the development of non-carbon materials has been advanced as well, and representative examples of such materials include silicon and amorphous silicon oxides (SiOx).

As negative electrode active substances for lithium ion secondary batteries, silicon and amorphous silicon oxides (silicon oxides in an amorphous state) are advantageous in having a high capacity; however, since they are greatly degraded by repeated charging and discharging, i.e., poor in cycle characteristics, and have a low initial efficiency in particular, they have not been put into practical use at present except for some cases. As materials solving these problems, Patent Documents 1 and 2 disclose silicon-based compounds that are used as negative electrode materials, which compounds have a domain structure in which silicon microcrystals are dispersed in a silicon compound (silicon oxide in particular).

Meanwhile, as negative electrode active substances for lithium ion secondary batteries, carbonaceous particles made of a graphite, such as a natural graphite, an artificial graphite obtained by graphitization of coke or the like, a graphitized mesophase pitch or a graphitized carbon fiber, have also been used because of their high capacity, excellent flatness of discharge potential and the like and, from the standpoint of further improving the capacity, attempts have been made to use such carbonaceous particles in combination with silicon oxide particles. For example, Patent Document 3 discloses the use of carbonaceous particles having a carbon layer at least partially on the surfaces of graphite particles in combination with silicon oxide particles. Further, Patent Document 4 discloses the use of a mixture of a spheroidized graphite and a flake graphite as carbonaceous particles in combination with silicon oxide particles.

RELATED ART DOCUMENTS

Patent Documents

[Patent Document 1] Japanese Laid-open Patent Application (Kokai) No. 2004-047404
[Patent Document 2] Japanese Laid-open Patent Application (Kokai) No. 2004-323284
[Patent Document 3] Japanese Laid-open Patent Application (Kokai) No. 2013-200983
[Patent Document 4] Japanese Laid-open Patent Application (Kokai) No. 2013-200984

SUMMARY OF THE INVENTION

Problems to be Solved by the Invention

In Patent Documents 1 and 2, it is also described that, as compared to silicon and amorphous silicon oxides (silicon oxides in an amorphous state), silicon-based compounds having a domain structure in which silicon microcrystals are dispersed in a silicon compound (silicon oxide in particular) exhibit superior cycle characteristics and initial efficiency in repeated charging and discharging, and that a carbon material is used as a conductive material in combination with such silicon-based compounds in negative electrode materials. However, according to the studies conducted by the present inventors, those lithium ion secondary batteries that are obtained using the negative electrode materials of Patent Documents 1 and 2 were found to have problems in that the batteries do not have a satisfactory balance between the discharge capacity and the initial efficiency and that their over-discharge characteristics are insufficient.

Meanwhile, the negative electrode material of Patent Document 3 was shown to have a charge capacity, a discharge capacity and rate characteristics that are improved in a well-balanced manner. Moreover, the negative electrode material of Patent Document 4 was shown to have a capacity retention rate, a charge-discharge efficiency and rate characteristics that are improved in a well-balanced manner. However, according to the studies conducted by the present inventors, it was found that lithium ion secondary batteries obtained using these negative electrode materials of Patent Documents 3 and 4 do not exhibit a sufficient initial efficiency.

That is, an object of the present invention is to provide: a negative electrode material for nonaqueous secondary batteries, which can yield a high-capacity nonaqueous secondary battery having excellent initial efficiency; and a negative electrode for nonaqueous secondary batteries and a nonaqueous secondary battery, which include the negative electrode material.

Another object of the present invention is to provide a nonaqueous secondary battery having excellent over-discharge characteristics.

Means for Solving the Problems

The present inventors intensively studied to solve the above-described problems and consequently discovered that the problems can be solved by using a specific carbon material in combination with silicon oxide particles containing zero-valent silicon atoms.

That is, the gist of the present invention is as follows.

[1] A negative electrode material for nonaqueous secondary batteries, the negative electrode material including silicon oxide particles (A) and a carbon material (B), wherein the silicon oxide particles (A) contain zero-valent silicon atoms, and the carbon material (B) has a volume resistivity of less than 0.14 Ω·cm at a powder density of 1.1 g/cm$^3$.

[2] The negative electrode material for nonaqueous secondary batteries according to [1], containing silicon microcrystals in the silicon oxide particles (A).

[3] The negative electrode material for nonaqueous secondary batteries according to [1] or [2], wherein the 10% cumulative particle size from the smaller particle side (d10) of the silicon oxide particles (A) is 0.001 μm to 6 μm.

[4] The negative electrode material for nonaqueous secondary batteries according to any one of [1] to [3], wherein the carbon material (B) is a composite carbon material obtained by making a spheroidized graphite and a carbonaceous material into a composite.

[5] The negative electrode material for nonaqueous secondary batteries according to any one of [1] to [4], wherein the carbon material (B) has a specific surface area of 15 m$^2$/g or smaller as determined by a BET method.

[6] The negative electrode material for nonaqueous secondary batteries according to any one of [1] to [5], wherein the silicon oxide particles (A) have an average particle size (d50) of 0.01 μm to 20 μm.

[7] A negative electrode for nonaqueous secondary batteries, the negative electrode including: a current collector; and an active substance layer formed on the current collector, wherein the active substance layer contains the negative electrode material for nonaqueous secondary batteries according to any one of [1] to [6].

[8] A nonaqueous secondary battery including: a positive electrode; a negative electrode; and an electrolyte, wherein the negative electrode is the negative electrode for nonaqueous secondary batteries according to [7].

[9] The nonaqueous secondary battery according to [8], wherein the electrolyte is an electrolyte solution contained in a nonaqueous solvent.

[10] The nonaqueous secondary battery according to [9], wherein the electrolyte solution contains lithium difluorophosphate, and the content thereof is 0.01% by weight to 2% by weight with respect to the whole electrolyte solution.

Effects of the Invention

According to the present invention, a negative electrode material for nonaqueous secondary batteries, which has a high capacity and excellent initial efficiency, as well as a negative electrode for nonaqueous secondary batteries and a nonaqueous secondary battery, which include the negative electrode material, are provided.

Further, according to the present invention, a nonaqueous secondary battery having excellent over-discharge characteristics is provided.

MODE FOR CARRYING OUT THE INVENTION

The present invention will now be described in detail; however, the present invention is not restricted to the following descriptions and can be modified arbitrarily within a range that does not depart from the gist of the present invention. It is noted here that, in the present invention, those ranges that are expressed with "to" before and after numerical or physical property values each denote a range that includes the respective numerical or physical property values.

[Carbon Material for Nonaqueous Secondary Battery Negative Electrode]

The carbon material for a nonaqueous secondary battery negative electrode according to the present invention (hereinafter, may be referred to as "the negative electrode material of the present invention") includes silicon oxide particles (A) (hereinafter, may be referred to as "the silicon oxide particles (A) used in the present invention") and a carbon material (B) (hereinafter, may be referred to as "the carbon material (B) used in the present invention"), the carbon material being characterized in that the silicon oxide particles (A) contain zero-valent silicon atoms and the carbon material (B) has a volume resistivity of less than 0.14 Ω·cm at a powder density of 1.1 g/cm$^3$.

[Mechanism]

<Mechanism of Action Based on Silicon Oxide Particles (A)>

In the negative electrode material of the present invention, by incorporating silicon oxide particles (A), which have a high capacity and show a small change in volume that is associated with reception and release of Li ions, a high-capacity negative electrode material in which deterioration of performance caused by the loss of contact with the carbon material (B) is limited can be obtained.

That is, by allowing the silicon oxide particles (A) to contain zero-valent silicon atoms, the range of potential in which the silicon oxide particles (A) receive and release Li ions is made close to that of the carbon material (B), and a change in the volume associated with reception and release of Li ions thus takes place simultaneously with that of the carbon material (B); therefore, the relative positional relationship between the carbon material (B) and the silicon oxide particles (A) at their interfaces is maintained, so that deterioration of performance caused by the loss of contact with the carbon material (B) can be suppressed.

Particularly, by controlling the ratio ($M_O/M_{Si}$) of the number of oxygen atoms (Mo) with respect to the number of silicon atoms ($M_{Si}$) in the silicon oxide particles (A) used in the present invention to be 0.5 to 1.6, the silicon oxide particles (A) is imparted with a high capacity and, at the same time, the amount of change in the volume, which is associated with reception and release of Li ions, is made close to that of carbon material (B); therefore, deterioration of performance caused by the loss of contact with the carbon material (B) can be suppressed.

<Mechanism of Action Based on Carbon Material (B)>

When the carbon material (B) has a volume resistivity of less than 0.14 Ω·cm at a powder density of 1.1 g/cm$^3$, in an electrode that contains silicon oxide particles showing greater expansion and contraction during charging and discharging as compared to a carbon material, a conductive path of particles can be ensured even in a state where the electrode is expanded; therefore, the discharge capacity is improved.

It is noted here that this volume resistivity is known as a physical property value of a carbon material as described in, for example, Japanese Laid-open Patent Application (Kokai) No. H10-116619. According to the studies conducted by the present inventors, as shown in the below-described Reference Examples 1-1 to 1-5, the volume resistivity did not contribute to an improvement in the charge-discharge efficiency and the like when the carbon material (B) was used alone. It was discovered for the first time by the present inventors that the charge-discharge efficiency is improved by using the carbon material (B) having a specific value or less of this physical property in combination with the specific silicon oxide particles (A).

<Mechanism of Action Attained by Blending Silicon Oxide Particles (A) and Carbon Material (B)>

It is believed that, by blending the silicon oxide particles (A) into the carbon material (B) having favorable contact properties, since breakage of conductive path caused by expansion during charging and discharging can be suppressed, a flow of excessively large current to only specific parts of the silicon oxide particles (A) and the carbon materials (B) in the electrode is suppressed, whereby a high capacity and excellent initial efficiency can be attained.

Particularly, it is believed that, by using a carbon material having a volume resistivity of a specific value or less as the carbon material (B), since the carbon material (B) can make favorable contact with SiOx particles and other particles, a flow of excessively large current to only specific parts of the silicon oxide particles (A) and the carbon materials (B) in the electrode is suppressed, and insertion and desorption of Li ions can thus be performed uniformly and smoothly even at a low temperature and in large-current charging and discharging, whereby a high capacity as well as excellent low-temperature output characteristics and initial efficiency can be attained.

[Silicon Oxide Particles (A)]
<Constitution>

The silicon oxide particles (A) used in the present invention contain zero-valent silicon atoms, and the silicon oxide particles (A) preferably contain silicon microcrystals. By using such silicon oxide particles, a negative electrode material having excellent cycle characteristics, particularly a high initial efficiency, can be obtained.

In the silicon oxide particles (A) used in the present invention, the ratio ($M_O/M_{Si}$) of the number of oxygen atoms (Mo) with respect to the number of silicon atoms ($M_{Si}$) is preferably 0.5 to 1.6. The ratio $M_O/M_{Si}$ is more preferably 0.7 to 1.3, particularly preferably 0.8 to 1.2. When the ratio $M_O/M_{Si}$ is in this range, because of the presence of particles composed of highly active amorphous silicon oxide through which alkali ions such as Li ions readily move in and out, the silicon oxide particles (A) can attain a higher capacity than carbon material (B), and a high cycle retention rate can be achieved by an amorphous structure. Moreover, since the silicon oxide particles (A) are filled into gaps formed by the carbon material (B) while maintaining contact with the carbon material (B), a change in the volume of the silicon oxide particles (A), which is associated with reception and release of alkali ions such as Li ions induced by charging and discharging, can be absorbed by the gaps. As a result, breakage of conductive path caused by such a change in the volume of the silicon oxide particles (A) can be suppressed.

In solid-state NMR ($^{29}$Si-DDMAS) spectrometry, it is preferred that the silicon oxide particles (A) containing zero-valent silicon atoms have a broad peak (P1) normally appearing for silicon oxide, which is centered at about −110 ppm and whose apex is particularly in a range of −100 to −120 ppm, along with a broad peak (P2) which is centered at −70 ppm and whose apex is particularly in a range of −65 to −85 ppm. The area ratio of these peaks (P2/P1) is in a range of preferably 0.1≤(P2)/(P1)≤1.0, more preferably 0.2≤(P2)/(P1)≤0.8. By allowing the silicon oxide particles (A) containing zero-valent silicon atoms to have the above-described property, a negative electrode material having a large capacity and excellent cycle characteristics can be obtained.

Further, it is preferred that the silicon oxide particles (A) containing zero-valent silicon atoms generate hydrogen when reacted with an alkali hydroxide. The amount of the zero-valent silicon atoms in the silicon oxide particles (A), which is calculated from the amount of hydrogen generated in this process, is preferably 2 to 45% by weight, more preferably about 5 to 36% by weight, still more preferably about 10 to 30% by weight. When the amount of the zero-valent silicon atoms is less than 2% by weight, the charge-discharge capacity may be small, whereas when this amount is greater than 45% by weight, the cycle characteristics may be deteriorated.

The silicon oxide particles (A) containing silicon microcrystals preferably have the following properties.

i. In X-ray diffractometry (Cu-Kα) using copper as a counter electrode, a diffraction peak centered at about 2θ=28.4°, which is attributable to Si (111), is observed, and the particle size of silicon crystals, which is determined by the Scherrer equation based on the spread of the diffraction line, is preferably 1 to 500 nm, more preferably 2 to 200 nm, still more preferably 2 to 20 nm. When the size of the silicon fine particles is smaller than 1 nm, the charge-discharge capacity may be small, whereas when this size is larger than 500 nm, since the silicon fine particles greatly expand and contract during charging and discharging, the cycle characteristics may be deteriorated. It is noted here that the size of the silicon fine particles can be measured on a transmission electron micrograph.

ii. In solid-state NMR ($^{29}$Si-DDMAS) spectrometry, the spectrum thereof has a broad peak of silicon dioxide that is centered at about −110 ppm, along with a peak at about −84 ppm, which is characteristic to Si diamond crystals. It is noted here that this spectrum is completely different from those of ordinary silicon oxides (SiOx, x=1.0+α), and the structure of the silicon oxide particles (A) itself is thus clearly different. Further, under a transmission electron microscope, it is confirmed that silicon crystals are dispersed in amorphous silicon dioxide.

The amount of the silicon microcrystals in the silicon oxide particles (A) is preferably 2 to 45% by weight, more preferably 5 to 36% by weight, still more preferably 10 to 30% by weight. When the amount of the silicon microcrystals is less than 2% by weight, the charge-discharge capacity may be small, whereas when this amount is greater than 45% by weight, the cycle characteristics may be poor.

<Physical Properties>
(Average Particle Size (d50))

The average particle size, namely the 50% volume-cumulative particle size from the smaller particle side (d50) in a volume-based particle size distribution, of the silicon oxide particles (A) used in the present invention is preferably 0.01 m to 20 μm. With the d50 of the silicon oxide particles (A) being in this range, when the silicon oxide particles (A) are incorporated into an electrode, the silicon oxide particles (A) exist in the gaps formed by the carbon material (B), and a change in the volume of the silicon oxide particles (A), which is associated with reception and release of alkali ions such as Li ions induced by charging and discharging, is absorbed by the gaps; therefore, breakage of conductive path caused by such a volume change is suppressed, as a result of which the cycle characteristics can be improved. The d50 of the silicon oxide particles (A) is more preferably 0.5 to 15 μm, still more preferably 1 to 10 μm, particularly preferably 1.5 to 8 μm.

It is noted here that, with regard to the silicon oxide particles (A) used in the present invention and the below-described carbon material (B) used in the present invention and negative electrode material of the present invention, the terms "average particle size (d50)", "d10" and "d90" used herein refer to the 50% volume-cumulative particle size from the smaller particle side (d50), the 10% volume-cumulative particle size from the same smaller particle side and the 90% volume-cumulative particle size from the same smaller particle side, which are measured based on a volume-based particle size distribution, respectively. These are measured by the method described below in the section of Examples.

The 10% volume-cumulative particle size from the smaller particle side (d10) in a volume-based particle size distribution of the silicon oxide particles (A) used in the present invention is preferably 0.001 m to 6 µm. When the d10 of the silicon oxide particles (A) is in this range, a good conductive path can be formed because of the presence of appropriate fine powder of the silicon oxide particles (A) in the gaps formed by the carbon material (B); therefore, not only favorable cycle characteristics can be attained but also an increase in the specific surface area is suppressed and the irreversible capacity can thereby be reduced. The d10 of the silicon oxide particles (A) is more preferably 0.01 to 4 µm, still more preferably 0.1 to 3 µm.

The 90% volume-cumulative particle size from the smaller particle side (d90) in a volume-based particle size distribution of the silicon oxide particles (A) used in the present invention is preferably 1 µm to 30 µm. When the d90 is in this range, since the silicon oxide particles (A) are likely to exist in the gaps formed by the carbon material (B), a good conductive path can be formed, and favorable cycle characteristics are thereby attained. The d90 of the silicon oxide particles (A) is more preferably 1.5 to 20 µm, still more preferably 2 to 15 µm, particularly preferably 3 to 10 µm.

<Specific Surface Area>

The silicon oxide particles (A) used in the present invention have a specific surface area, which is determined by a BET method, of preferably 80 m²/g or smaller, more preferably 60 m²/g or smaller, but preferably 0.5 m²/g or larger, more preferably 1 m²/g or larger, still more preferably 1.5 m²/g or larger. When the specific surface area of the silicon oxide particles (A) based on a BET method is in this range, the input-output efficiency of alkali ions such as Li ions can be favorably maintained, and the silicon oxide particles (A) have a preferred size; therefore, the silicon oxide particles (A) is allowed to exist in the gaps formed by the carbon material (B) and can thereby secure a conductive path with the carbon material (B). Further, since the silicon oxide particles (A) have a preferred size, an increase in the irreversible capacity is suppressed and a high capacity can thereby be ensured.

The specific surface area based on a BET method is determined by the method described below in the section of Examples.

<Method of Producing Silicon Oxide Particles (A)>

The term "silicon oxide particles" used herein is a general term for particles composed of a silicon oxide represented by SiOx (wherein, 0<x<2) that are usually obtained by using silicon dioxide (SiO₂) as a raw material and thermally reducing this SiO₂ with metallic silicon (Si) and/or carbon (it is noted here that an element other than silicon and carbon can be doped as described below and, in this case, the resulting particles have a composition formula different from SiOx; however, such particles are also included in the silicon oxide particles (A) used in the present invention). Silicon (Si) has a higher theoretical capacity than graphites, and alkali ions such as lithium ions can easily enter or exit amorphous silicon oxide, so that a high capacity can be attained.

As described above, the silicon oxide particles (A) used in the present invention contain zero-valent silicon atoms, and such silicon oxide particles (A) can be produced by, for example, performing the below-described disproportionation treatment on silicon oxide particles (A1) or silicon oxide particles (A2) that are produced in the below-described manner.

The silicon oxide particles subjected to the disproportionation treatment in the production of the silicon oxide particles (A) used in the present invention may be composite-type silicon oxide particles each having a carbon layer composed of amorphous carbon at least partially on the surface of a silicon oxide particle serving as a nucleus. As such silicon oxide particles, one selected from the group consisting of silicon oxide particles (A1) having no such carbon layer composed of amorphous carbon and composite-type silicon oxide particles (A2) may be used singly, or two or more thereof may be used in combination. The phrase "having a carbon layer composed of amorphous carbon at least partially on the surface" used herein encompasses not only a mode in which the carbon layer covers a part or the entirety of the surface of a silicon oxide particle in the form of a layer, but also a mode in which the carbon layer is adhered or impregnated to a part or the entirety of the surface. The carbon layer may be provided in such a manner to cover the entirety of the surface, or only a part of the surface may be covered or adhered/impregnated with the carbon layer.

(Method of Producing Silicon Oxide Particles (A1))

A method of producing the silicon oxide particles (A1) is not restricted and, for example, silicon oxide particles produced by the method described in Japanese Patent No. 3952118 can be used. Specifically, a silicon dioxide powder and metallic silicon powder or carbon powder are mixed at a specific ratio and, after loading the thus obtained mixture to a reactor, the mixture is heated to and maintained at a temperature of 1,000° C. or higher under normal pressure or a specific reduced pressure and thereby allowed to generate a SiOx gas, and the thus generated SiOx gas is subsequently cooled to precipitate, whereby silicon oxide particles represented by a general formula SiOx (wherein, 0.5≤x≤1.6) can be obtained. The particles can be produced by performing a mechanical energy treatment on the thus obtained precipitates.

The mechanical energy treatment is performed by, for example, a method in which, using a device such as a ball mill, a vibrating ball mill, a planetary ball mill or a rolling ball mill, a raw material and a moving body that does not react with the raw material are loaded to a reaction vessel, and vibration, rotation or a combination of these movements is applied thereto. As a result, the silicon oxide particles (A) satisfying the above-described physical properties can be formed.

(Method of Producing Composite-Type Silicon Oxide Particles (A2))

A method of producing the composite-type silicon oxide particles (A2) each having a carbon layer composed of amorphous carbon at least partially on the surface of a silicon oxide particle is not particularly restricted. The composite-type silicon oxide particles (A2) each having a carbon layer composed of amorphous carbon at least partially on the surface of a silicon oxide particle can be produced by mixing the silicon oxide particles (A1) with a petroleum-based or coal-based tar or pitch and a resin such as a polyvinyl alcohol, a polyacrylonitrile, a phenolic resin or cellulose using, as required, a solvent or the like, and subsequently calcinating the resulting mixture in a non-oxidizing atmosphere at a temperature of 500° C. to 3,000° C., preferably 700° C. to 2,000° C., more preferably 800 to 1,500° C.

(Disproportionation Treatment)

The silicon oxide particles (A) used in the present invention can be produced by further performing a heat treatment on the silicon oxide particles (A1) or composite-type silicon oxide particles (A2) that are produced in the above-described manner. By performing a disproportionation treatment, a structure in which zero-valent silicon atoms are unevenly distributed as Si microcrystals in amorphous SiOx is formed and, as described above in the section of [Mechanism] relating to the negative electrode material of the present invention, because of the Si microcrystals in amorphous SiOx, the range of potential in which the silicon oxide particles (A) receive and release Li ions is made close to that of the carbon material (B), and a change in volume associated with reception and release of Li ions thus takes place simultaneously with that of the carbon material (B); therefore, the relative positional relationship between the carbon material (B) and the silicon oxide particles (A) at their interfaces is maintained, so that deterioration of performance caused by the loss of contact with the carbon material (B) can be suppressed.

This disproportionation treatment can be performed by heating the silicon oxide particles (A1) or the composite-type silicon oxide particles (A2) under an inert gas atmosphere in a temperature range of 900 to 1,400° C.

When the heating temperature in the disproportionation treatment is lower than 900° C., disproportionation does not proceed at all or it requires an extremely long time for the formation of silicon fine cells (siliconmicrocrystals), which is not efficient. On the other hand, when the heating temperature is higher than 1,400° C., since structuring of silicon dioxide moieties proceeds and the movement of Li ions is thereby inhibited, the functions of a lithium ion secondary battery may be deteriorated. The heating treatment temperature in the disproportionation treatment is preferably 1,000 to 1,300° C., more preferably 1,100 to 1,250° C. The duration of the treatment (disproportionation time) can be controlled as appropriate in a range of 10 minutes to 20 hours, particularly about 30 minutes to 12 hours, in accordance with the disproportionation treatment temperature, and, for example, it is preferred to perform the treatment for at least 5 hours when the treatment temperature is 1,100° C.

For the disproportionation treatment, a reaction apparatus having a heating mechanism can be used in an inert gas atmosphere, and the reaction apparatus is not particularly restricted. The treatment can be performed in a continuous or batchwise manner and, specifically, a fluidized bed reactor, a rotary furnace, a vertical moving bed reactor, a tunnel furnace, a batch furnace, a rotary kiln or the like can be selected as appropriate in accordance with the intended purpose. In this case, as a (treatment) gas, a gas that is inert at the above-described treatment temperature, such as Ar, He, H or N—, can be used singly, or a mixed gas thereof can be used.

(Production of Carbon-Coated/Silicon Microcrystal-Dispersed Silicon Oxide Particles)

As described below, the silicon oxide particles (A) used in the present invention can also be produced by simultaneously performing carbon coating and disproportionation treatment as composite-type silicon oxide particles in which the surfaces of silicon microcrystal-containing silicon oxide particles are coated with carbon.

A method of producing such composite-type silicon oxide particles is not particularly restricted; however, for example, any of the following methods I to III can be preferably employed.

I: a method in which silicon oxide powder represented by a general formula SiOx (0.5≤x<1.6) is used as a raw material, and this raw material is heat-treated under an atmosphere containing at least an organic gas and/or steam in a temperature range of 900 to 1,400° C., preferably 1,000 to 1,400° C., more preferably 1,050 to 1,300° C., still more preferably 1,100 to 1,200° C., so as not only to disproportionate the raw material silicon oxide powder into a composite of silicon and silicon dioxide but also to perform chemical vapor deposition on the surface thereof.

II: a method in which, for example, a silicon composite obtained by disproportionating silicon oxide powder represented by a general formula SiOx (0.5≤x<1.6) in advance through a heat treatment performed under an inert gas atmosphere at a temperature of 900 to 1,400° C., preferably 1,000 to 1,400° C., more preferably 1,100 to 1,300° C.; a composite obtained by coating silicon fine particles with silicon dioxide in accordance with a sol-gel method; a composite obtained by sintering silicon fine powder that has been coagulated with fine powder silica such as fumed silica or precipitated silica via water; or silicon and a partial oxide or nitride thereof, which have been heated in an inert gas flow at 800 to 1,400° C. pulverized to a particle size of 0.1 to 50 µm and in advance, is used as a raw material, and this raw material is heat-treated under an atmosphere containing at least an organic gas and/or steam in a temperature range of 800 to 1,400° C., preferably 900 to 1,300° C., more preferably 1,000 to 1,200° C., so as to perform chemical vapor deposition on the surface.

III: a method in which silicon oxide powder represented by a general formula SiOx (0.5≤x<1.6), which has been subjected to a chemical vapor deposition treatment in advance with an organic gas and/or steam in a temperature range of 500 to 1,200° C., preferably 500 to 1,000° C., more preferably 500 to 900° C., is used as a raw material, and this raw material is disproportionated through a heat treatment performed under an inert gas atmosphere in a temperature range of 900 to 1,400° C., preferably 1,000 to 1,400° C., more preferably 1,100 to 1,300° C.

In the chemical vapor deposition treatment (i.e., thermal CVD treatment) performed in a temperature range of 800 to 1,400° C. (preferably 900 to 1,400° C., particularly preferably 1,000 to 1,400° C.) in the above-described method I or II, when the heat treatment temperature is lower than 800° C., fusion of the resulting conductive carbon coating film and silicon composite as well as alignment of carbon atoms (crystallization) are insufficient, whereas when the heat treatment temperature is higher than 1,400° C., since structuring of silicon dioxide moieties proceeds and the movement of lithium ions is thereby inhibited, the functions of a lithium ion secondary battery may be deteriorated.

Meanwhile, as for the disproportionation of silicon oxide in the above-described method I or III, when the heat treatment temperature is lower than 900° C., the disproportionation does not proceed at all or it requires an extremely long time for the formation of silicon fine cells (silicon microcrystals), which is not efficient. On the other hand, when the heat treatment temperature is higher than 1,400° C., since structuring of silicon dioxide moieties proceeds and the movement of lithium ions is thereby inhibited, the functions of a lithium ion secondary battery may be deteriorated.

In the method III, disproportionation of silicon oxide is performed at 900 to 1,400° C., particularly 1,000 to 1,400° C., after a chemical vapor deposition (CVD) treatment; therefore, even when the chemical vapor deposition (CVD) treatment is performed in a temperature range of lower than 800° C., a product in which a conductive carbon coating film of aligned (crystallized) carbon atoms and a silicon composite are fused together on the surface can be obtained eventually.

In this manner, a carbon film is preferably formed by performing a thermal CVD (chemical vapor deposition at 800° C. or higher), and the duration of the thermal CVD is set as appropriate based on the relation with the amount of carbon. This treatment may cause aggregation of the particles; however, the resulting aggregates are crushed using a ball mill or the like. Depending on the case, thermal CVD is performed again in the same manner.

In the method I, when a silicon oxide represented by a general formula SiOx ($0.5 \leq x < 1.6$) is used as a raw material, it is important to allow a disproportionation reaction to take place simultaneously with the chemical vapor deposition treatment and to thereby finely disperse silicon having a crystal structure in silicon dioxide and, in this case, it is necessary to appropriately select the treatment temperature, the treatment time, the type of the raw material generating an organic gas, and the organic gas concentration for allowing the chemical vapor deposition and the disproportionation to proceed. The heat treatment time ((CVD/disproportionation) time) is selected to be in a range of usually 0.5 to 12 hours, preferably 1 to 8 hours, particularly 2 to 6 hours. This heat treatment time is also related with the heat treatment temperature ((CVD/disproportionation) temperature) and, for example, it is preferred to perform the treatment for at least 5 hours when the treatment temperature is 1,000° C.

Further, in the method II, when the heat treatment is performed under an atmosphere containing an organic gas and/or steam, the duration of this heat treatment (CVD treatment time) can be in a range of usually 0.5 to 12 hours, particularly 1 to 6 hours. When a silicon oxide represented by SiOx is disproportionated in advance, the duration of this heat treatment (disproportionation time) can be usually 0.5 to 6 hours, particularly 0.5 to 3 hours.

Moreover, in the method III, the duration of treating the SiOx by chemical vapor deposition in advance (CVD treatment time) can be usually 0.5 to 12 hours, particularly 1 to 6 hours, and the duration of the heat treatment under an inert gas atmosphere (disproportionation time) can be usually 0.5 to 6 hours, particularly 0.5 to 3 hours.

As an organic material used as a raw material generating an organic gas, one that can be thermally decomposed at the above-described heat treatment temperature particularly under a non-oxidizing atmosphere to produce carbon (graphite) is selected, and examples of such an organic material include aliphatic or alicyclic hydrocarbons, such as methane, ethane, ethylene, acetylene, propane, butane, butene, pentane, isobutane and hexane, and mixtures thereof; and monocyclic to tricyclic aromatic hydrocarbons, such as benzene, toluene, xylene, styrene, ethylbenzene, diphenylmethane, naphthalene, phenol, cresol, nitrobenzene, chlorobenzene, indene, coumarone, pyridine, anthracene and phenanthrene, and mixtures thereof. In addition, gas light oils, creosote oils, anthracene oils, and naphtha-cracked tar oils, which are obtained by tar distillation process, may be used singly or as a mixture.

For the above-described thermal CVD (thermal chemical vapor deposition) treatment and/or disproportionation treatment, a reaction apparatus having a heating mechanism can be used in a non-oxidizing atmosphere, and the reaction apparatus is not particularly restricted. The treatment(s) can be performed in a continuous or batchwise manner and, specifically, a fluidized bed reactor, a rotary furnace, a vertical moving bed reactor, a tunnel furnace, a batch furnace, a rotary kiln or the like can be selected as appropriate in accordance with the intended purpose. In this case, as a (treatment) gas, any one of the above-described organic gasses, or a mixed gas of an organic gas and a non-oxidizing gas, such as Ar, He, $H_2$ or $N_2$, can be used.

In this case, a reaction apparatus having a structure in which a furnace core tube is arranged horizontally and rotates, such as a rotary furnace or a rotary kiln, is preferred and, by using such a reaction apparatus to perform the chemical vapor deposition treatment while rolling the silicon oxide particles, the production can be stably carried out without causing aggregation of the silicon oxide particles. The rotation speed of the furnace core tube is preferably 0.5 to 30 rpm, particularly 1 to 10 rpm. It is noted here that this reaction apparatus is not particularly restricted as long as it has a furnace core tube capable of retaining an atmosphere, a rotating mechanism which rotates the furnace core tube, and a heating mechanism capable of increasing and maintaining the temperature. Depending on the intended purpose, the reaction apparatus may be equipped with a raw material supplying mechanism (e.g., a feeder) and/or a product retrieval mechanism (e.g., a hopper), and the furnace core tube may be inclined or provided with a baffle plate therein for controlling the raw material retention time. The material of the furnace core tube is also not particularly restricted and may be selected as appropriate from ceramics, such as silicon carbide, alumina, mullite and silicon nitride, high-melting-point metals such as molybdenum and tungsten, SUS, and quartz in accordance with the conditions and purpose of the treatment.

Further, by controlling the ratio ($u/u_{mf}$) of the fluidizing gas linear velocity u (m/sec) and the fluidization starting velocity $u_{mf}$ to be in a range of $1.5 \leq u/u_{mf} \leq 5$, a conductive coating film can be formed more efficiently. When the value of $u/u_{mf}$ is smaller than 1.5, the fluidization may be insufficient, causing variations in the resulting conductive coating film, whereas when the value of $u/u_{mf}$ is larger than 5, secondary aggregation of the particles may occur and hinder the formation of a uniform conductive coating film. It is noted here that the fluidization starting velocity varies depending on the size of the particles, the treatment temperature, the treatment atmosphere and the like, and can be defined as the fluidizing gas linear velocity of when the fluidizing gas (linear velocity) is gradually increased and the powder pressure loss in this process has reached W (powder weight)/A (cross-sectional area of fluidized bed). The $u_{mf}$ can be in a range of usually 0.1 to 30 cm/sec, preferably about 0.5 to 10 cm/sec, and the particle size providing such a value of $u_{mf}$ can be generally 0.5 to 100 μm, preferably 5 to 50 μm. A particle size of smaller than 0.5 μm may cause secondary aggregation, preventing the surface of each particle from being effectively treated.

<Doping of Other Element to Silicon Oxide Particles (A)>

The silicon oxide particles (A) may be doped with an element other than silicon and oxygen. The silicon oxide particles (A) doped with an element other than silicon and oxygen have a stabilized chemical structure inside the particles and are thus expected to improve the initial efficiency and the cycle characteristics. In addition, since the lithium ion acceptability is improved in such silicon oxide particles (A) and made close to that of the carbon material (B), the use of a negative electrode material containing a combination of these silicon oxide particles (A) and carbon material (B) enables to produce a battery in which, even during rapid charging, excessive concentration of lithium ions does not occur in the negative electrode and metallic lithium is thus unlikely to precipitate.

As the element to be doped, usually, any element that does not belong to Group 18 of the periodic table can be selected; however, in order to make the silicon oxide particles (A) doped with an element other than silicon and oxygen more stable, an element belonging to the first four periods of the periodic table is preferred. Specifically, the element to be doped can be selected from those elements belonging to the first four periods of the periodic table, such as alkali metals, alkaline earth metals, Al, Ga, Ge, N, P, As, and Se. In order to improve the lithium ion acceptability of the silicon oxide particles (A) doped with an element other than silicon and oxygen, the element to be doped is preferably an alkali metal or alkaline earth metal that belongs to the first four periods of the periodic table, more preferably Mg, Ca or Li, still more preferably Li. These elements may be used singly, or in combination of two or more thereof.

In the silicon oxide particles (A) doped with an element other than silicon and oxygen, the ratio ($M_D/M_{Si}$) of the number of atoms of the doped element ($M_D$) with respect to the number of silicon atoms ($M_{Si}$) is preferably 0.01 to 5, more preferably 0.05 to 4, still more preferably 0.1 to 3. When the ratio $M_D/M_{Si}$ is lower than this range, the effect of doping the element other than silicon and oxygen cannot be attained, whereas when the ratio $M_D/M_{Si}$ is higher than this range, the element other than silicon and oxygen that is not consumed in the doping reaction may remain on the surfaces of the silicon oxide particles to cause a reduction in the capacity of the silicon oxide particles.

Examples of a method of producing the silicon oxide particles (A) doped with an element other silicon and oxygen include a method in which silicon oxide particles are mixed with the element to be doped itself or a powder of a compound containing the element, and the resulting mixture is subsequently heated at a temperature of 50 to 1,200° C. under an inert gas atmosphere. Examples of the method also include a method in which a silicon dioxide powder is mixed with a metallic silicon powder or carbon powder at a specific ratio, the element to be doped itself or a powder of a compound containing the element is added thereto and, after loading the thus obtained mixture to a reactor, the mixture is heated to and maintained at a temperature of 1,000° C. or higher under normal pressure or a specific reduced pressure and thereby allowed to generate a gas, and the thus generated gas is cooled and precipitated to obtain silicon oxide particles doped with an element other than silicon and oxygen.

[Carbon Material (B)]

<Carbon Material (B) Having Specific Volume Resistivity>

The type of the carbon material (B) used in the present invention is not particularly restricted as long as the volume resistivity thereof at a powder density of 1.1 g/cm³ (hereinafter, may be simply referred to as "volume resistivity") is less than 0.14 Ω·cm. A volume resistivity of less than 0.14 Ω·cm at a powder density of 1.1 g/cm³ means that the carbon material (B) is a material which has a volume resistivity of less than 0.14 Ω·cm even in such a low-density state of 1.1 g/cm³ and exhibits favorable contact properties of its particles. This ensures a sufficient conductive path; therefore, the negative electrode material of the present invention has excellent cycle characteristics.

In the carbon material (B), from the standpoint of the contact properties of the particles, the volume resistivity is preferably 0.12 Ω·cm or less, more preferably 0.10 Ω·cm or less, still more preferably 0.060 Ω·cm or less, yet still more preferably 0.040 Ω·cm or less. The lower limit of the volume resistivity is not particularly restricted; however, it is usually 0.001 Ω·cm or higher.

A method of measuring the volume resistivity of the carbon material (B) is as follows.

(Method of Measuring Volume Resistivity (Ω·cm))

The volume resistivity of the carbon material (B) used in the present invention at a powder density of 1.1 g/cm³ is measured using a powder resistance measurement apparatus (e.g., powder resistance measurement system MCP-PD51, LORESTA GP four-terminal model and MCP-T600; manufactured byMitsubishiChemicalAnalytech Co., Ltd.). The carbon material (B) in an amount of 3.0 g is loaded to a cylindrical powder resistance measurement container having a cross-sectional area of 3.14 cm² and gradually pressurized to increase the powder density, and the value of volume resistivity measured when the powder density has reached 1.1 g/cm³ is used as the volume resistivity of the carbon material (B). The method is more specifically as follows.

<Detailed Measurement Method>

First, the apparatus is calibrated.

For the correction of load, it is confirmed that the load is 0 kgf/3.14 cm² in a state where the bottom of the cylindrical container to be loaded with the carbon material (B) is not in contact with a push rod that is inserted into the container from above to apply a pressure to the carbon material (B).

Next, a thickness gauge is calibrated. A zero calibration is performed such that the thickness gauge indicates 0.00 mm when the cylindrical container and the push rod are brought close to each other using a hydraulic pump and the load has reached 20 kgf/3.14 cm². After the completion of the calibration, 3.0 g of the carbon material (B) is added to the cylindrical container of 2 cm in diameter, and the height of the carbon material (B) is adjusted such that a load can be evenly applied thereto. A base is raised using the hydraulic pump to insert the push rod into the cylindrical container and, while checking the thickness gauge, a pressure is applied to slowly bring the powder density closer to 1.1 g/cm³, and the value measured when the powder density has reached 1.1 g/cm³ is used. In order to reduce variations in the measurement, the measurement is performed at least twice. When the measured values vary, the measurement is performed three times, and the average of two closest values is used.

The volume resistivity of each carbon material (B) produced in the below-described Examples was also determined by this method.

(Method of Controlling Volume Resistivity)

Examples of a method of controlling the volume resistivity of the carbon material (B) at a powder density of 1.1 g/cm³ to be less than 0.14 Ω·cm include the following methods (1) to (3):

(1) a method of using a carbon material having a moderately flat structure;
(2) a method of using a combination of carbon materials having different particle sizes and shapes; and
(3) a method of mixing or compositing a carbon material with a conductive auxiliary agent.

With regard to the method (1), it is preferred to control the structure such that the contact properties of particles are improved even in a low-density state. Specifically, the bulk density or the tap density of the carbon material (B) may be appropriately controlled such that the contact properties of the particles can be improved when the particles are compressed to a density of 1.1 g/cm$^3$, or the aspect ratio may be appropriately controlled such that the particles planarly contact with each other. When the method (1) is employed, since the particles sufficiently contact with each other even in a low-density state, the volume resistivity value tends to be low.

In this case, the tap density of the carbon material (B) is preferably 0.5 to 1.3 g/cm$^3$, more preferably 0.7 to 1.1 g/cm$^3$, 0.75 to 1.05 g/cm$^3$, or 0.80 to 1.00 g/cm$^3$. The aspect ratio of the carbon material (B) may be appropriately controlled such that the particles planarly contact with each other. It is noted here that the tap density of the carbon material (B) is measured by the method described below in the section of Examples.

Defining the major axis and the minor axis of the carbon material (B) as "a" and "b", respectively, the aspect ratio (a/b) of the carbon material (B) is 1 when the carbon material (B) is theoretically true-spherical. The value of a/b is preferably 1 to 10, more preferably 2 to 5. When the method (1) is employed, since the particles planarly contact with each other, the volume resistivity value tends to be low. For determination of the aspect ratio of the carbon material (B), the carbon material (B) can be observed under a scanning electron microscope capable of performing magnified observation. Fifty particles of the carbon material (B) immobilized on the end surface of a metal having a thickness of 50 microns or less are selected arbitrarily, and the values of a and b are measured for each of the particles while rotating and tilting a stage on which a sample is immobilized, after which the average value of a/b is calculated.

Further, when the method (1) is employed, the circularity is usually 0.70 or higher, preferably 0.80 or higher, more preferably 0.83 or higher, still more preferably 0.85 or higher, but 1 or lower, preferably 0.96 or lower, more preferably 0.93 or lower, still more preferably 0.92 or lower, particularly preferably 0.91 or lower, most preferably 0.90 or lower. When the circularity is in this range, deterioration of the cycle characteristics of a nonaqueous secondary battery tends to be suppressed. It is noted here that the circularity is defined by the following formula, and the carbon material (B) is theoretically true-spherical when the circularity is 1. When the circularity is in the above-described range, since the particles are moderately flat, the contact properties of the particles can be favorably maintained.

(Circularity)=(Circumferential length of an equivalent circle having the same area as projected particle shape)/(actual circumferential length of projected particle shape)

As for the above-described method (2), specifically, particles having different particles sizes (d50, d90 and d10) and aspect ratios may be mixed. When the method (2) is employed, small particles enter between large particles to improve the contact properties of the particles, and particles of a high aspect ratio function to connect particles of a low aspect ratio with one another; therefore, the volume resistivity value tends to be low. The term "aspect ratio" used here is the same as in the above-described method (1).

When the method (3) is employed, the conductive auxiliary agent may be, for example, a flake graphite, a carbon black, Ketjen black, acetylene black, carbon nanotubes, or carbon fibers. When a carbon material is mixed with such a conductive auxiliary agent, the volume resistivity value tends to be low since the contact properties of the particles of the carbon material are improved by the conductive auxiliary agent.

In the case of making the carbon material and the conductive auxiliary agent into a composite, specifically, for example, a method of mixing the carbon material with an organic precursor serving as a binder and subsequently calcinating the resulting mixture so as to bind the organic precursor on the particle surfaces, or a method of binding these materials by composite formation through a mechanochemical treatment or by van der Waals force, can be employed. When the conductive auxiliary agent is made into a composite with the carbon material, since the dispersibility and the bindability of the conductivity auxiliary agent on the carbon material surface are improved, the volume resistivity value tends to be low. Examples of an organic precursor that can be used in this case include petroleum-based heavy oils obtained in naphtha pyrolysis, such as ethylene heavy end; tars; pitches, such as coal pitches, coal-tar pitches, petroleum pitches, and synthetic pitches; and resins, such as vinyl chloride, vinylidene chloride, polyacrylonitriles, phenolic resins, and aromatic polyimides. These organic precursors may be used singly, or in combination of two or more thereof.

As the carbon material (B), as long as its volume resistivity value is in the above-described range, various carbon materials can be used singly, or plural kinds of carbon materials can be used in combination. Examples of carbon materials that can be used include graphite particles, such as natural graphites and artificial graphites; and calcination products and the like of a material selected from the group consisting of coal coke, petroleum coke, furnace black, acetylene black and pitch-based carbon fibers, which have slightly lower crystallinity than the graphite particles.

Natural graphites are classified into flake graphite, crystalline graphite, vein graphite, and amorphous graphite, depending on their properties (see the section of "Graphite" in "Encyclopedia of powder process industry and technology", published by Industrial Technology Center in 1974; and "HANDBOOK OF CARBON, GRAPHITE, DIAMOND AND FULLERENES" (published by Noyes Publications)). In the present invention, crystalline graphite and vein graphite which have the highest graphitization degree of 100%, and flake graphite having the second highest graphitization degree of 99.9% are preferred.

Flake graphite is mainly produced in, for example, Madagascar, China, Brazil, Ukraine and Canada, and crystalline graphite is mainly produced in Sri Lanka. Amorphous graphite is mainly produced in, for example, the Korean Peninsula, China, and Mexico.

Specific examples of natural graphites include crystalline, flake, or vein natural graphites; highly purified flake graphite; and natural graphite subjected to a spheroidization treatment (hereinafter, may be referred to as "spheroidized natural graphite"). Thereamong, spheroidized natural graphite is preferred since it is capable of forming suitable fine pores inside a carbon material and exhibits excellent particle-filling properties and charge-discharge load characteristics.

Examples of artificial graphites include those obtained by calcinating and graphitizing organic substances, such as coal-tar pitch, coal-based heavy oils, atmospheric residues, petroleum-based heavy oils, aromatic hydrocarbons, nitrogen-containing cyclic compounds, sulfur-containing cyclic compounds, polyphenylenes, polyvinyl chlorides, polyvinyl alcohols, polyacrylonitriles, polyvinyl butyrals, natural polymers, polyphenylene sulfides, polyphenylene oxides, furfuryl alcohol resins, phenol-formaldehyde resins, and imide resins; and those obtained by graphitizingbulkmesophase. Further, a granular artificial graphite, which is obtained by mixing a graphitizable aggregate (e.g., bulk mesophase) or graphite and a graphitizable organic substance with an addition of a graphitization catalyst and subsequently calcinating and pulverizing the resulting mixture, can be used as well. The calcination temperature can be set in a range of 2,500° C. to 3,200° C., and a silicon-containing compound, a boron-containing compound or the like may be used as the graphitization catalyst in the calcination process.

Examples of carbonaceous materials having a low graphitization degree include those obtained by calcinating organic substances usually at a temperature of lower than 2,500° C., specifically bulk mesophase and amorphous carbon. Examples of the organic substances include coal-based heavy oils, such as coal-tar pitch and dry distillation-liquefied oil; straight-run heavy oils, such as atmospheric residues and vacuum residues; petroleum-based heavy oils such as cracked heavy oils, for example, ethylene tar produced as a by-product in thermal cracking of crude oil, naphtha or the like; aromatic hydrocarbons, such as acenaphthylene, decacyclene, and anthracene; nitrogen-containing cyclic compounds, such as phenazine and acridine; sulfur-containing cyclic compounds, such as thiophene; aliphatic cyclic compounds, such as adamantane; and thermoplastic polymers, including polyphenylenes such as biphenyl and terphenyl, polyvinyl esters such as polyvinyl chlorides, polyvinyl acetates and polyvinyl butyrals, and polyvinyl alcohols.

Examples of the bulk mesophase include carbonaceous materials obtained by heat-treating a petroleum-based heavy oil, a coal-based heavy oil or a straight-run heavy oil at 400 to 600° C. Further, examples of the amorphous carbon include particles obtained by calcinating a bulk mesophase, and particles obtained by infusibilizing and calcinating a carbonaceous material precursor.

The amorphous carbon can be calcinated in a temperature range of 600° C. or higher, preferably 900° C. or higher, more preferably 950° C. or higher, but usually lower than 2,500° C. preferably 2,000° C. or lower, more preferably 1,400° C. or lower, depending on the crystallization degree.

In the calcination, the organic substance may be mixed with, for example, an acid such as phosphoric acid, boric acid or hydrochloric acid, or an alkali such as sodium hydroxide.

Further, the above-exemplified carbon materials may be in the form of a mixture or composite with a conductive auxiliary agent and the like as in the above-described (3). Among the above-exemplified carbon materials, for example, composite carbon materials obtained by making a spheroidized graphite and a carbonaceous material into a composite, and composite carbon materials obtained by making a flake graphite and a carbonaceous material into a composite are preferred.

<Physical Properties>

The carbon material (B) preferably satisfies the following physical properties.

(Average Particle Size (d50))

The average particle size (d50) of the carbon material (B) used in the present invention is preferably 1 μm or larger, more preferably 5 μm or larger, still more preferably 8 μm or larger, but usually 50 m or smaller, preferably 40 μm or smaller, more preferably 35 μm or smaller, still more preferably 30 μm or smaller, particularly preferably 25 μm or smaller. An excessively small d50 of the carbon material (B) tends to cause an increase in the irreversible capacity and a reduction in the initial battery capacity in a nonaqueous secondary battery obtained using the carbon material (B), whereas an excessively large d50 may result in the occurrence of a process defect, such as such as formation of streaks in slurry application, and cause deterioration of the high-current-density charge-discharge characteristics and the low-temperature input-output characteristics.

(Tap Density)

In the carbon material (B), from the standpoint of the contact properties of particles, the tap density is usually 1.3 $g/cm^3$ or lower, preferably 1.2 $g/cm^3$ or lower, more preferably 1.1 $g/cm^3$ or lower, still more preferably 0.9 $g/cm^3$ or lower. The lower limit of the tap density is not particularly restricted; however, it is usually 0.5 $g/cm^3$ or higher. A tap density of higher than 1.3 $g/cm^3$ makes it difficult to maintain sufficient contact of particles at a low particle density, whereas a tap density of less than 0.5 $g/cm^3$ makes it difficult to coat an electrode with the carbon material (B).

(BET Specific Surface Area (SA))

The specific surface area (SA) of the carbon material (B) used in the present invention, which is determined by a BET method, is preferably 2 $m^2/g$ or larger, more preferably 3 $m^2/g$ or larger, but preferably 15 $m^2/g$ or smaller, more preferably 10 $m^2/g$ or smaller, still more preferably 5 $m^2/g$ or smaller. When the specific surface area is in this range, since a sufficient amount of sites can be ensured for entry and exit of Li, excellent rapid charge-discharge characteristics and output characteristics are attained, and the activity of active substance with an electrolyte solution can be controlled at an appropriate level; therefore, a high-capacity battery tends to be produced without an increase in the initial irreversible capacity. In addition, when a negative electrode is formed using the carbon material (B), an increase in the reactivity thereof with an electrolyte solution can be suppressed, and generation of a gas can thus be inhibited; therefore, a preferable nonaqueous secondary battery can be provided.

(Raman R Value)

The Raman R value of the carbon material (B) used in the present invention is usually 0.01 or larger, preferably 0.1 or larger, more preferably 0.2 or larger, still more preferably 0.25 or larger, particularly preferably 0.3 or larger. The upper limit of the Raman R value is not particularly restricted; however, it is usually 1 or smaller, preferably 0.7 or smaller, more preferably 0.6 or smaller, still more preferably 0.5 or smaller.

$$(\text{Raman value } R) = (\text{Intensity } I_B \text{ of peak } P_B \text{ near } 1{,}360 \text{ cm}^{-1}/\text{Intensity } I_A \text{ of peak } P_A \text{ near } 1{,}580 \text{ cm}^{-1})$$
in Raman spectrum analysis It is noted here that, in the present invention, the term "near 1,580 $cm^{-1}$" refers to a range of 1,580 to 1,620 $cm^{-1}$ and the term "near 1,360 $cm^{-1}$" refers to a range of 1,350 to 1,370 $cm^{-1}$. When the Raman R value is in the above-described range, since the carbon material has an appropriate crystallinity of particle surfaces and this allows a sufficient amount of sites for insertion and desorption of Li ions to exist; therefore, a carbon material having favorable low-temperature input-output characteristics and discharge capacity tends to be obtained.

(Powder Resistance of Mixed Powder of Silicon Oxide Particles (A) and Carbon Material (B))

The carbon material (B) used in the present invention preferably satisfies the following property I in its relationship with the above-described silicon oxide particles (A) used in the present invention.

Property I: A mixed powder obtained by mixing the silicon oxide particles (A) and the carbon material (B) at a ratio of 10/90 (weight ratio) has a powder resistance of 0.25 Ω·cm or less at a powder density of 1.1 g/cm$^3$.

This property I means that the mixed powder of the silicon oxide particles (A) and the carbon material (B) has favorable contact properties even in such a low-density state of 1.1 g/cm$^3$.

The powder resistance of the mixed powder of the silicon oxide particles (A) and the carbon material (B) can be measured in the same manner as the method of measuring the volume resistivity of the carbon material (B) used in the present invention, and the powder resistance of each mixed powder of mixed powder of the silicon oxide particles (A) and the carbon material (B) in the below-described section of Examples was also measured in the same manner.

From the standpoint of the contact properties of particles, the powder resistance of the mixed powder is preferably 0.25 Ω·cm or less, more preferably 0.15 Ω·cm or less, still more preferably 0.10 Ω·cm or less, particularly preferably 0.075 Ω·cm or less, most preferably 0.060 Ω·cm or less. The lower limit of the powder resistance is not particularly restricted; however, it is usually 0.001 Ω·cm or higher.

As a method of controlling the mixed powder obtained by mixing the silicon oxide particles (A) and the carbon material (B) at a ratio (A)/(B) of 10/90 (weight ratio) to have the above-described preferred volume resistivity value, the following methods can be exemplified:

(1) a method of controlling the volume resistivity of the carbon material (B) to be less than 0.14 Ω·cm; and
(2) a method of controlling the particle size distribution of the silicon oxide particles (A).

[Negative Electrode Material]
<Content Ratio of Silicon Oxide Particles (A) and Carbon Material (B)>

The negative electrode material of the present invention preferably contains the silicon oxide particles (A) and the carbon material (B), which are used in the present invention and have the above-described physical properties suitable for the present invention, at a ratio ([weight of carbon material (B)]:[weight of silicon oxide particles (A)]) of 30:70 to 99:1, particularly 40:60 to 98:2, especially 50:50 to 95:5. By mixing the carbon material (B) and the silicon oxide particles (A) at such a ratio, since the silicon oxide particles (A), which have a high capacity and show a small change in volume that is associated with reception and release of Li ions, are allowed to exist in the gaps formed by the carbon material (B), a high-capacity negative electrode material in which deterioration of performance caused by the loss of contact with the carbon material (B) is limited can be obtained.

The type of the negative electrode material of the present invention is not particularly restricted as long as a mixture of the silicon oxide particles (A) and the carbon material (B) that are used in the present invention has a volume resistivity at a powder density of 1.1 g/cm$^3$ (hereinafter, may be simply referred to as "volume resistivity") of 0.60 Ω·cm or less. A volume resistivity of 0.60 Ω·cm or less at a powder density of 1.1 g/cm$^3$ means that the carbon material (B) is a material which has a volume resistivity of 0.60 Ω·cm or less even in such a low-density state of 1.1 g/cm$^3$ and exhibits favorable contact properties of its particles. This ensures a sufficient conductive path; therefore, the negative electrode material of the present invention has excellent cycle characteristics.

<Physical Properties>
(Volume Resistivity)

In the negative electrode material of the present invention, from the standpoint of the contact properties of the particles, the volume resistivity is preferably 0.25 Ω·cm or less, more preferably 0.15 Ω·cm or less, still more preferably 0.10 Ω·cm or less, particularly preferably 0.075 Ω·cm or less, most preferably 0.060 Ω·cm or less. The lower limit of the volume resistivity is not particularly restricted; however, it is usually 0.001 Ω·cm or higher.

The volume resistivity of the negative electrode material is measured by the method described above in the section of "[Carbon Material (B)]".

(Average Particle Size (d50))

In the negative electrode material of the present invention, the average particle size, namely the 50% cumulative particle size from the smaller particle side in a volume-based particle size distribution (d50), is preferably 3 μm to 30 μm. When the d50 of the negative electrode material of the present invention is 3 μm or larger, an increase in the irreversible capacity caused by an increase in the specific surface area can be inhibited. Meanwhile, when the d50 is 30 μm or smaller, deterioration of the rapid charge-discharge characteristics due to a reduction in the contact area between an electrolyte solution and the particles of the negative electrode material can be inhibited. The d50 of the negative electrode material is preferably 5 to 25 μm, more preferably 7 to 20 μm.

(Tap Density)

The tap density of the negative electrode material of the present invention is preferably 0.5 to 1.4 g/cm$^3$, more preferably 0.7 to 1.3 g/cm$^3$, still more preferably 0.8 to 1.2 g/cm$^3$. When the negative electrode material having a tap density in this range is used as a negative electrode, an electrolyte solution and the silicon oxide particles (A) can exist in gaps formed by the carbon material (B), so that a conductive path can be ensured and favorable cycle characteristics can thus be attained even in a low-density state after repeated charging and discharging.

The tap density is determined by the method described below in the section of Examples.

(Specific Surface Area)

The specific surface area of the negative electrode material of the present invention, which is determined by a BET method, is usually 0.5 m$^2$/g or larger, preferably 2 m$^2$/g or larger, more preferably 3 m$^2$/g or larger, but usually 20 m$^2$/g or smaller, preferably 15 m$^2$/g or smaller, more preferably 10 m$^2$/g or smaller, still more preferably 9 m$^2$/g or smaller. When the specific surface area is smaller than this range, since the amount of sites for entry and exit of Li is small, the rapid charge-discharge characteristics, output characteristics and low-temperature input-output characteristics of a lithium ion secondary battery are deteriorated, whereas when the specific surface area is larger than this range, since the activity of active substance with an electrolyte solution is excessively high, an increase in side reactions with the electrolyte solution causes a reduction in the battery initial charge-discharge efficiency and an increase in the gas generation, and the battery capacity tends to be reduced as a result.

The specific surface area based on a BET method is determined by the method described below in the section of Examples.

[Negative Electrode for Nonaqueous Secondary Batteries]

The negative electrode for nonaqueous secondary batteries according to the present invention (hereinafter, may be referred to as "the negative electrode of the present invention") includes a current collector and an active substance layer formed on the current collector, and the active substance layer contains the negative electrode material of the present invention.

For the production of the negative electrode using the negative electrode material of the present invention, the negative electrode material blended with a binder resin may be made into a slurry with an aqueous or organic medium and, after adding a thickening agent thereto as required, the slurry may be coated and dried on a current collector.

As the binder resin, it is preferred to use a resin that is stable to nonaqueous electrolyte solutions and insoluble in water. Examples of such a binder resin that can be used include rubbery polymers, such as styrene-butadiene rubbers, isoprene rubbers, and ethylene-propylene rubbers; synthetic resins, such as polyethylene, polypropylene, polyethylene terephthalate, polyimide, polyacrylic acid, and aromatic polyamide; thermoplastic elastomers, such as styrene-butadiene-styrene block copolymers and hydrogenation products thereof, styrene-ethylene-butadiene-styrene copolymers, styrene-isoprene-styrene block copolymers, and hydrogenation products thereof; flexible resinous polymers, such as syndiotactic 1,2-polybutadiene, ethylene-vinyl acetate copolymers, and copolymers of ethylene and an α-olefin having 3 to 12 carbon atoms; and fluorinated polymers, such as polytetrafluoroethylene-ethylene copolymers, polyvinylidene fluoride, polypentafluoropropylene, and polyhexafluoropropylene. As the organic medium, for example, N-methylpyrrolidone or dimethylformamide can be used.

The binder resin is used in an amount of usually not less than 0.1 parts by weight, preferably not less than 0.2 parts by weight, with respect to 100 parts by weight of the negative electrode material. By using the binder resin in an amount of 0.1 parts by weight or greater with respect to 100 parts by weight of the negative electrode material, a sufficient binding strength is attained between the negative electrode constituting materials such as the active substance layer and between the negative electrode constituting materials and the current collector, so that a reduction in the battery capacity and deterioration of the cycle characteristics, which are caused by detachment of the negative electrode constituting materials from the negative electrode, can be inhibited.

Further, the amount of the binder resin to be used is preferably not greater than 10 parts by weight, more preferably not greater than 7 parts by weight, with respect to 100 parts by weight of the negative electrode material. By using the binder resin in an amount of 10 parts by weight or less with respect to 100 parts by weight of the negative electrode material, not only a reduction in the capacity of the negative electrode can be inhibited but also problems such as inhibition of movement of alkali ions (e.g., lithium ions) in and out of the negative electrode material can be avoided.

Examples of the thickening agent added to the slurry include water-soluble celluloses, such as carboxymethyl cellulose, methyl cellulose, hydroxyethyl cellulose, and hydroxypropyl cellulose; polyvinyl alcohols; and polyethylene glycols. Thereamong, carboxymethyl cellulose is preferred. The thickening agent is used in an amount of usually 0.1 to 10 parts by weight, particularly preferably 0.2 to 7 parts by weight, with respect to 100 parts by weight of the negative electrode material.

As the current collector of the negative electrode, for example, any of copper, a copper alloy, stainless steel, nickel, titanium and carbon that are conventionally known to be usable for this application may be used. The shape of the current collector is usually a sheet shape, and it is also preferred to use a current collector having irregularities on the surface, a net, a punched metal or the like.

After the slurry composed of the negative electrode material and the binder resin is coated and dried on the current collector, it is preferred that the resultant be pressed so as to increase the density of the active substance layer formed on the current collector and to thereby increase the battery capacity per unit volume of the active substance layer of the negative electrode. The density of the active substance layer is in a range of preferably 1.2 to 1.8 g/cm$^3$, more preferably 1.3 to 1.6 g/cm$^3$.

By controlling the density of the active substance layer to be 1.2 g/cm$^3$ or higher, a reduction in the battery capacity due to an increase in the electrode thickness can be inhibited. In addition, by controlling the density of the active substance layer to be 1.8 g/cm$^3$ or lower, the amount of an electrolyte solution retained in voids is reduced in association with a decrease in voids between the particles inside the electrode, so that the mobility of alkali ions such as lithium ions is reduced and deterioration of the rapid charge-discharge characteristics can thereby be prevented.

The active substance layer of the negative electrode is preferably configured such that the silicon oxide particles (A) exist in gaps formed by the carbon material (B). By the presence of the silicon oxide particles (A) in the gaps formed by the carbon material (B), the capacity can be increased and a conductive path is ensured, so that the cycle characteristics can be improved.

In the active substance layer of the negative electrode that is formed by using negative electrode material of the present invention, the volume of pores having a size in a range of 10 nm to 100,000 nm, which is determined by a mercury intrusion method, is preferably 0.05 ml/g, more preferably 0.1 ml/g or greater. By controlling the volume of such pores to be 0.05 ml/g or greater, the area for entry and exit of alkali ions such as lithium ions is increased.

[Nonaqueous Secondary Battery]

The nonaqueous secondary battery of the present invention is a nonaqueous secondary battery including a positive electrode, a negative electrode and an electrolyte, in which the negative electrode of the present invention is used as the negative electrode.

The nonaqueous secondary battery of the present invention can be produced in accordance with a conventional method, except that the above-described negative electrode of the present invention is used.

[Positive Electrode]

In the nonaqueous secondary battery of the present invention, examples of a positive electrode material that may be used as an active substance of the positive electrode include lithium-transition metal composite oxides, such as lithium-cobalt composite oxide having a basic composition represented by $LiCoO_2$, lithium-nickel composite oxide represented by $LiNiO_2$, and lithium-manganese composite oxide represented by $LiMnO_2$ or $LiMnzO_4$; transition metal oxides, such as manganese dioxide; and mixtures of these composite oxides. Further, $TiS_7$, $FeS$, $Nb_3S_4$, $Mo_3S_4$, $CoS_2$, $V_2O_5$, $CrO_3$, $V_3O_3$, $FeO_2$, $GeO_2$, $LiNi_{0.33}Mn_{0.33}Co_{0.33}O_2$, $LiFePO_4$ and the like may be used as well.

The positive electrode can be produced by making the above-described positive electrode material blended with a binder resin into a slurry with an appropriate solvent and subsequently coating and drying this slurry on a current collector. It is preferred to incorporate a conductive material, such as acetylene black or Ketjen black, into the slurry. Further, a thickening agent may also be incorporated as desired.

As the thickening agent and the binder resin, ones that are well-known for this application, for example, those exemplified above for use in the production of the negative electrode, may be used. With respect to 100 parts by weight of the positive electrode material, the blending ratio of the conductive material is preferably 0.5 to 20 parts by weight, particularly preferably 1 to 15 parts by weight, and the blending ratio of the thickening agent is preferably 0.2 to 10 parts by weight, particularly preferably 0.5 to 7 parts by weight.

With respect to 100 parts by weight of the positive electrode material, the blending ratio of the binder resin in the case of preparing a slurry of the binder resin with water is preferably 0.2 to 10 parts by weight, particularly preferably 0.5 to 7 parts by weight, and the blending ratio of the binder resin in the case of preparing a slurry of the binder resin with an organic solvent capable of dissolving the binder resin, such as N-methylpyrrolidone, is 0.5 to 20 parts by weight, particularly preferably 1 to 15 parts by weight.

Examples of the current collector of the positive electrode include aluminum, titanium, zirconium, hafnium, niobium, tantalum, and alloys thereof. Thereamong, aluminum, titanium, tantalum and alloys thereof are preferred, and aluminum and alloys thereof are most preferred.

[Electrolyte]

The electrolyte used in the nonaqueous secondary battery of the present invention may be an all-solid electrolyte or an electrolyte solution containing an electrolyte in a nonaqueous solvent; however, it is preferably an electrolyte solution containing an electrolyte in a nonaqueous solvent.

As the electrolyte solution, any conventionally well-known electrolyte solution obtained by dissolving various lithium salts in a nonaqueous solvent can be used. Examples of a nonaqueous solvent that can be used include cyclic carbonates, such as ethylene carbonate, fluoroethylene carbonate, propylene carbonate, butylene carbonate, and vinylene carbonate; chain carbonates, such as dimethyl carbonate, ethyl methyl carbonate, and diethyl carbonate; chain carboxylic acid esters, such as methyl acetate, methyl propionate, ethyl propionate, ethyl acetate, and n-propyl acetate; cyclic esters, such as γ-butyrolactone; cyclic ethers, such as crown ethers, 2-methyltetrahydrofuran, tetrahydrofuran, 1,2-dimethyltetrahydrofuran, and 1,3-dioxolane; and chain ethers, such as 1,2-dimethoxyethane. Usually, two or more of these nonaqueous solvents are used in combination. Among these nonaqueous solvents, it is preferred to use a cyclic carbonate, a chain carbonate, a chain carboxylic acid ester, or a mixture obtained by further adding other solvent thereto. As the cyclic carbonate, ethylene carbonate or fluoroethylene carbonate is preferred from the standpoint of improving the cycle characteristics. As the chain carbonate, dimethyl carbonate or ethyl methyl carbonate is preferred from the standpoint of reducing the viscosity of the electrolyte solution. As the chain carboxylic acid ester, methyl acetate or methyl propionate is preferred from the standpoint of reducing the viscosity of the electrolyte solution as well as from the standpoint of the cycle characteristics.

Examples of an electrolyte to be dissolved in the nonaqueous solvent include $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CFSO_2)_3$. In the electrolyte solution, the concentration of the electrolyte is usually 0.5 to 2 mol/L, preferably 0.6 to 1.5 mol/L.

To the electrolyte solution, for example, a compound such as vinylene carbonate, vinyl ethylene carbonate, fluoroethylene carbonate, methyl phenyl carbonate, succinic anhydride, maleic anhydride, propane sultone or diethyl sulfone, and/or a difluorophosphate such as lithium difluorophosphate may also be added. Further, an overcharge inhibitor such as diphenyl ether or cyclohexylbenzene may be added as well. Among these compounds, from the standpoint of the over-discharge characteristics, preferably at least one selected from vinylene carbonate, vinyl ethylene carbonate, fluoroethylene carbonate, methyl phenyl carbonate and lithium difluorophosphate, particularly preferably lithium difluorophosphate, is added to the electrolyte solution.

When lithium difluorophosphate is contained in the electrolyte solution, the content thereof is preferably not less than 0.01% by weight, more preferably not less than 0.1% by weight, still more preferably not less than 0.2% by weight, but preferably 2% by weight or less, more preferably 1.5% by weight or less, still more preferably 1.4% by weight or less, with respect to the total amount of the electrolyte solution. When the content of lithium difluorophosphate in the electrolyte solution is in this range, the nonaqueous electrolyte secondary battery is likely to exhibit a sufficient cycle characteristics-improving effect, and problems such as deterioration of the high-temperature storage characteristics, an increase in the gas generation, and a reduction in the discharge capacity retention rate are likely to be avoided.

The mechanism in which the over-discharge characteristics are improved by incorporation of lithium difluorophosphate will now be described.

<Actions and Effects Based on Incorporation of Silicon Oxide Particles (A) and Lithium Difluorophosphate>

Lithium difluorophosphate has polarized P—F bonds and is thus readily attacked by a nucleophile. The silicon oxide particles generate $Li_{22}Si_5$ and $Li_4SiO_4$ when doped with lithium, and nucleophilic $Li_{22}Si_5$ undergoes a nucleophilic substitution reaction with lithium difluorophosphate on the particle surfaces. In this process, the loss of electricity is suppressed since the reaction is not one based on electrochemical reductive decomposition but is a nucleophilic substitution reaction that does not accompany the consumption of electricity. In addition, on the particle surfaces where the nucleophilic substitution reaction took place, Si—P(=O)OLi structures are formed and this yields a passive-state coating film, whereby reductive decomposition of the electrolyte solution component is suppressed. Moreover, since Si—P(=O)OLi is a lithium-containing structure, it does not interfere with the doping of lithium ions, so that the occurrence of an overvoltage can be inhibited. Accordingly, the occurrence of variation in potential on the particle surfaces is inhibited, as a result of which decomposition of the electrolyte component is suppressed. It is believed that the over-discharge characteristics are improved by these effects.

Particularly, when disproportionated silicon oxide particles having a structure in which zero-valent silicon atoms are unevenly distributed as Si microcrystals in amorphous SiOx are used, the ratio of $Li_{22}Si_5$ is increased when the particles are doped with lithium, and the above-described effects are thereby further enhanced.

<Actions and Effects Based on Carbon Material (B) and Lithium Difluorophosphate>

By inhibiting the occurrence of an overvoltage in the silicon oxide particles with the use of lithium difluorophosphate, variations in charging can be suppressed, and the amount of change in volume associated with reception and release of Li ions can be reduced. As a result, interfacial displacement of carbon particles and the silicon oxide particles can be made less likely to occur, and a reduction in the discharge capacity can be suppressed. Particularly, in the carbon material (B) having favorable contact properties, breakage of conductive path is made less likely to occur, and the effects thereof can be appreciated strongly.

[Separator]

As a separator to be interposed between the positive electrode and the negative electrode, it is preferred to use a porous sheet or nonwoven fabric made of a polyolefin, such as polyethylene or polypropylene.

[Capacity Ratio of Negative Electrode and Positive Electrode]

The nonaqueous secondary battery of the present invention is designed such that the capacity ratio of the negative electrode and the positive electrode (negative electrode/positive electrode) is preferably 1.01 to 1.5, more preferably 1.2 to 1.4.

The nonaqueous secondary battery of the present invention is preferably a lithium ion secondary battery which includes a positive electrode and a negative electrode that are capable of receiving and releasing Li ions, and an electrolyte.

EXAMPLES

The present invention will now be described more concretely by way of Examples thereof; however, the present invention is not restricted to the below-described Examples as long as they do not depart from the gist of the present invention. The values of various production conditions and evaluation results in the below-described Examples each have a meaning as a preferred upper or lower limit value in an embodiment of the present invention, and a preferred range may be defined by a combination of an upper or lower limit value described above and a value described below in an Example, or a combination of values in Examples.

[Methods of Measuring and Evaluating Physical Properties and Characteristics]

[Measurement of Physical Properties of Silicon Oxide Particles (A), Carbon Material (B) and Negative Electrode Material]

<Volume Resistivity (Ω·cm)>

The volume resistivity of the carbon material (B) used in the present invention at a powder density of 1.1 g/cm$^3$ was measured using a powder resistance measurement apparatus (powder resistance measurement system MCP-PD51, LORESTA GP four-terminal model and MCP-T600; manufactured by Mitsubishi Chemical Analytech Co., Ltd.). The carbon material (B) in an amount of 3.0 g was loaded to a cylindrical powder resistance measurement container having a cross-sectional area of 3.14 cm$^2$ and gradually pressurized to increase the powder density, and the value of volume resistivity measured when the powder density reached 1.1 g/cm$^3$ was used as the volume resistivity of the carbon material (B).

<Particle Size Distribution>

The volume-based particle size distribution was measured for a sample that had been dispersed in a 0.2%-by-weight aqueous solution (about 10 mL) of a surfactant, polyoxyethylene (20) sorbitan monolaurate, using a laser diffraction-scattering particle size distribution analyzer LA-700 (manufactured by HORIBA, Ltd.).

<Tap Density>

The tap density was measured using a powder density meter TAP DENSER KYT-3000 (manufactured by Seishin Enterprise Co., Ltd.). After filling up a 20-cc tap cell with a sample by dropping the sample thereto, the cell was tapped 1,000 times at a stroke length of 10 mm, and the density measured at this point was defined as the tap density.

<Specific Surface Area (BET Method)>

The specific surface area was measured using TriStar 113000 manufactured by Micromeritics Instrument Corp. A sample was vacuum-dried at 150° C. for 1 hour, and the specific surface area was subsequently measured by a multi-point BET method based on nitrogen gas adsorption (five points in a relative pressure range of 0.05 to 0.30).

<Circularity>

Using a flow-type particle image analyzer (FPIA-2000, manufactured by Toa Medical Electronics, Ltd.), the particle size distribution was measured based on equivalent circle diameter, and the average circularity was calculated. Ion exchanged water and polyoxyethylene (20) monolaurate were used as a dispersion medium and a surfactant, respectively. The term "equivalent circle diameter" refers to the diameter of a circle (equivalent circle) having the same projected area as that of a captured particle image, and the term "circularity" refers to a ratio determined by taking the circumferential length of the equivalent circle as the numerator and that of a captured projection image of a particle as the denominator. The circularity values of particles having a measured equivalent diameter in a range of 10 to 40 μm were averaged, and the thus obtained value was defined as the circularity.

<Aspect Ratio>

For determination of the aspect ratio of the carbon material (B), the carbon material (B) was observed under a scanning electron microscope capable of performing magnified observation. Fifty particles of the carbon material (B) immobilized on the end surface of a metal having a thickness of 50 microns or less were selected arbitrarily, and the major axis (a) and the minor axis (b) were measured for each of the particles while rotating and tilting a stage on which the sample was immobilized, after which the average value of a/b was calculated.

[Battery Evaluation]

<Production of Battery I for Performance Evaluation>

Using a hybridization mixer, a slurry was prepared by kneading 97.5% by weight of a mixture of the below-described carbon material and silicon oxide particles along with 1% by weight of carboxymethyl cellulose (CMC) as a binder and 3.1% by weight of a 48%-by-weight aqueous dispersion of styrene-butadiene rubber (SBR). A 20 μm-thick copper foil was coated with this slurry by a blade method such that a basis weight of 4 to 5 mg/cm$^2$ was attained, and this copper foil was subsequently dried.

Thereafter, a negative electrode sheet was obtained by roll-pressing the copper foil such that a negative electrode active substance layer having a density of 1.2 to 1.4 g/cm$^3$ was formed, and a circular piece of 12.5 mm in diameter was punched out from the thus obtained negative electrode sheet and subsequently vacuum-dried at 90° C. for 8 hours, whereby a negative electrode for evaluation was produced.

<Production of Nonaqueous Secondary Battery (Coin-Type Battery)>

The electrode sheet prepared by the above-described method was used as a negative electrode for evaluation, and a lithium metal foil punched out in a disk shape of 15 mm in diameter was used as a counter electrode. Between these electrodes, a separator (made of a porous polyethylene film), which had been impregnated with an electrolyte solution obtained by dissolving $LiPF_6$ in a mixed solvent of ethylene carbonate and ethyl methyl carbonate (volume ratio=3:7) at a concentration of 1 mol/L, was arranged, whereby a coin-type battery I for performance evaluation was produced.

<Discharge Capacity, Charge Capacity, and Efficiency>

Using the nonaqueous secondary battery (coin-type battery) produced by the above-described method, the charge capacity (mAh/g) and the discharge capacity (mAh/g) during charging and discharging of the battery were measured in accordance with the following measurement method.

The lithium counter electrode was charged to 5 mV at a current density of 0.05 C and further charged to a current density of 0.005 C at a constant voltage of 5 mV. After the negative electrode was doped with lithium, the lithium counter electrode was discharged to 1.5 V at a current density of 0.1 C.

The charge capacity and the discharge capacity were determined as follows. The weight of the copper foil punched out to have the same area as the negative electrode was subtracted from the weight of the negative electrode, and the thus obtained value was multiplied by a coefficient determined from the composition ratio of the negative electrode active substance and the binder so as to determine the weight of the negative electrode active substance. The charge capacity and the discharge capacity in the first cycle were divided by the weight of the negative electrode active substance, whereby the charge capacity per weight and the discharge capacity per weight were determined, respectively.

The thus determined charge capacity (mAh/g) and discharge capacity (mAh/g) were defined as "first charge capacity" (mAh/g) and "first discharge capacity" (mAh/g) of the negative electrode material, respectively.

Further, a value obtained by dividing the discharge capacity (mAh/g) measured in the first cycle by the charge capacity (mAh/g) measured in the first cycle and then multiplying this value by 100 was defined as "first efficiency" (%).

[Carbon Material (B)]
<Carbon Material (B1)>

Graphite particles having a d50 value of 9.8 μm, a BET specific surface area of 9.4 $m^2$/g and a tap density of 0.70 g/$cm^3$ were mixed with tar as an amorphous carbon precursor and, after the thus obtained mixture was heat-treated at 1,300° C. in an inert gas, the resulting calcination product was pulverized and classified to obtain a multi-layered carbon material (B1) in which an amorphous carbon layer was formed on the surfaces of the graphite particles. From the calcination yield, it was confirmed that, in the thus obtained multi-layered carbon material (B1), 100 parts by weight of graphite was coated with 8 parts by weight of amorphous carbon.

The physical properties of this carbon material (B1) were measured by the above-described respective measurement methods. The results thereof are shown in Table 1.

<Carbon Material (B2)>

Graphite particles having a d50 value of 10.6 μm, a BET specific surface area of 8.2 $m^2$/g and a tap density of 0.85 g/$cm^3$ were mixed with tar as an amorphous carbon precursor and, after the thus obtained mixture was heat-treated at 1,300° C. in an inert gas, the resulting calcination product was pulverized and classified to obtain a multi-layered carbon material (B2) in which an amorphous carbon layer was formed on the surfaces of the graphite particles. From the calcination yield, it was confirmed that, in the thus obtained multi-layered carbon material (B2), 100 parts by weight of graphite was coated with 7 parts by weight of amorphous carbon.

The physical properties of this carbon material (B2) were measured by the above-described respective measurement methods. The results thereof are shown in Table 1.

<Carbon Material (B3)>

To graphite particles having a d50 value of 7.8 μm, a BET specific surface area of 12.0 $m^2$/g and a tap density of 0.90 g/$cm^3$, 3.0% by weight of a carbon black having a primary particle size of 24 nm, a BET specific surface area (SA) of 115 $m^2$/g and a DBP oil absorption amount of 110 ml/100 g was added, followed by mixing and stirring. The resulting mixed powder was mixed with a petroleum-based heavy oil obtained in naphtha pyrolysis as a carbonaceous material precursor, and the resultant was heat-treated at 1,300° C. in an inert gas, after which the thus obtained calcination product was pulverized and classified, whereby composite carbon particles (B3), in which carbon black fine particles and amorphous carbon were adhered to the surfaces of the graphite particles, were obtained.

From the calcination yield, it was confirmed that, in the thus obtained multi-layered carbon material (B3), 100 parts by weight of graphite was coated with 1.5 parts by weight of amorphous carbon. The physical properties of this carbon material (B3) were measured by the above-described respective measurement methods. The results thereof are shown in Table 1.

<Carbon Material (b1)>

Using a commercially available needle artificial graphite as a carbon material (b1), the physical properties thereof were measured by the above-described respective measurement methods. The results thereof are shown in Table 1.

<Carbon Material (b2)>

Using a commercially available artificial graphite in the form of mesocarbon microbeads (hereinafter, referred to as "MCMB") as a carbon material (b2), the physical properties thereof were measured by the above-described respective measurement methods. The results thereof are shown in Table 1.

<Carbon Material (b3)>

Graphite particles having a volume-based average particle size (d50) of 16.3 μm, a BET specific surface area (SA) of 6.8 $m^2$/g and a tap density of 0.99 g/$cm^3$ were mixed with a petroleum-based heavy oil obtained in naphtha pyrolysis as an amorphous carbon precursor and, after the thus obtained mixture was heat-treated at 1,300° C. in an inert gas, the resulting calcination product was pulverized and classified to obtain a multi-layered carbon material in which amorphous carbon were adhered to the surfaces of the graphite particles.

From the calcination yield, it was confirmed that, in the thus obtained multi-layered carbon material, 100 parts by mass of graphite was coated with 4 parts by mass of amorphous carbon.

The physical properties of this carbon material (b3) were measured by the above-described respective measurement methods. The results thereof are shown in Table 1.

[Silicon Oxide Particles (A)]
<Silicon Oxide Particles (a1)>

As silicon oxide particles (a1), commercially available silicon oxide particles (SiOx, x=1) (manufactured by OSAKA Titanium Technologies Co., Ltd.) were used. The silicon oxide particles had a d50 value of 5.6 μm and a BET specific surface area of 3.5 $m^2$/g. No diffraction line attributable to Si(111) in the vicinity of 2θ=28.4° was observable in the X-ray diffraction pattern of the silicon oxide particles (a1); therefore, it was confirmed that the silicon oxide particles (a1) did not contain any zero-valent silicon atom as microcrystals.

<Silicon Oxide Particles (A1)>

Silicon oxide particles (A1) were obtained by heat-treating the silicon oxide particles (a1) at 1,000° C. for 6 hours in an inert atmosphere. The silicon oxide particles (A1) had a d50 value of 5.4 μm and a BET specific surface area of 2.1 $m^2$/g. A diffraction line attributable to Si(111) in the vicinity of 2θ=28.4° was observable in the X-ray diffraction pattern of the silicon oxide particles (A1); therefore, it was confirmed that the silicon oxide particles (A1) contained zero-valent silicon atoms as microcrystals. It is noted here that the particle size of silicon crystals, which was determined by the Scherrer equation based on the spread of the diffraction line, was 3.2 nm.

EXAMPLES AND COMPARATIVE EXAMPLES

The physical properties of the silicon oxide particles (a1) and (A1) are summarized in Table 2.

Further, with regard to the respective combinations of the above-described carbon materials (B1), (B2), (B3), (b1), (b2) or (b3) and silicon oxide particles (A1) or (a2), the volume resistivity of a mixed powder obtained by mixing the silicon oxide particles (A) and the carbon material (B) at a ratio of 10/90 (mass ratio) was measured at a powder density of 1.1 g/cm$^3$, and the results thereof are shown in Table 3.

Example 1-1

A mixture was obtained by dry-mixing 90 parts by weight of the carbon material (B1) with 10 parts by weight of the silicon oxide particles (A1). Various evaluations were performed by the above-described respective measurement methods.

Example 1-2

A mixture was obtained by dry-mixing 90 parts by weight of the carbon material (B2) with 10 parts by weight of the silicon oxide particles (A1). The same evaluations were performed as in Example 1-1.

Example 1-3

A mixture was obtained by dry-mixing 90 parts by weight of the carbon material (B3) with 10 parts by weight of the silicon oxide particles (A1). The same evaluations were performed as in Example 1-1.

Comparative Example 1-1

A mixture was obtained by dry-mixing 90 parts by weight of the carbon material (b1) with 10 parts by weight of the silicon oxide particles (A1). The same evaluations were performed as in Example 1-1.

Comparative Example 1-2

A mixture was obtained by dry-mixing 90 parts by weight of the carbon material (b2) with 10 parts by weight of the silicon oxide particles (A1). The same evaluations were performed as in Example 1-1.

Comparative Example 1-3

A mixture was obtained by dry-mixing 90 parts by weight of the carbon material (b3) with 10 parts by weight of the silicon oxide particles (A1). The same evaluations were performed as in Example 1-1.

Comparative Example 1-4

A mixture was obtained by dry-mixing 90 parts by weight of the carbon material (B1) with 10 parts by weight of the silicon oxide particles (a1). The same evaluations were performed as in Example 1-1.

Comparative Example 1-5

A mixture was obtained by dry-mixing 90 parts by weight of the carbon material (B2) with 10 parts by weight of the silicon oxide particles (a1). The same evaluations were performed as in Example 1-1.

Comparative Example 1-6

A mixture was obtained by dry-mixing 90 parts by weight of the carbon material (b1) with 10 parts by weight of the silicon oxide particles (a1). The same evaluations were performed as in Example 1-1.

Comparative Example 1-7

A mixture was obtained by dry-mixing 90 parts by weight of the carbon material (b2) with 10 parts by weight of the silicon oxide particles (a1). The same evaluations were performed as in Example 1-1.

Comparative Example 1-8

A mixture was obtained by dry-mixing 90 parts by weight of the carbon material (b3) with 10 parts by weight of the silicon oxide particles (a1). The same evaluations were performed as in Example 1-1.

The physical properties of the mixtures obtained in Examples 1-1 to 1-3 and Comparative Examples 1-1 to 1-8 are summarized in Table 4.

TABLE 1

| | d50 (μm) | d90 (μm) | d10 (μm) | Specific surface area (m$^2$/g) | Tap density (g/cm$^3$) | Volume resistivity (Ω · cm) * | Circularity (—) |
|---|---|---|---|---|---|---|---|
| Carbon material (B1) | 11.9 | 19.5 | 7.2 | 3.6 | 0.87 | 0.021 | 0.88 |
| Carbon material (B2) | 11.5 | 18.0 | 7.6 | 3.1 | 1.06 | 0.044 | 0.92 |
| Carbon material (B3) | 7.7 | 11.9 | 5.2 | 8.9 | 1.00 | 0.059 | 0.92 |
| Carbon material (b1) | 19.0 | 33.9 | 10.5 | 1.9 | 1.10 | 0.14 | 0.88 |
| Carbon material (b2) | 18.4 | 28.6 | 11.4 | 1.2 | 1.49 | 26 | 0.97 |
| Carbon material (b3) | 15.5 | 25.3 | 8.7 | 3.2 | 1.14 | 0.40 | 0.93 |

* Volume resistivity at a powder density of 1.1 g/cm$^3$

TABLE 2

| | d50 (μm) | d90 (μm) | d10 (μm) | Specific surface area (m$^2$/g) | Si crystal diameter (nm) |
|---|---|---|---|---|---|
| Silicone oxide particles (a1) | 5.6 | 11.9 | 1.7 | 3.5 | — |
| Silicon oxide particles (a2) | 16.8 | 39.6 | 5.7 | 0.9 | — |
| Silicon oxide particles (A1) | 5.4 | 11.0 | 1.6 | 2.1 | 3.2 |

TABLE 3

|  | Combination | Volume resistivity (Ω·cm) * |
|---|---|---|
| Example 1-1 | Silicon oxide particles (A1)/Carbon material (B1) | 0.037 |
| Example 1-2 | Silicon oxide particles (A1)/Carbon material (B2) | 0.066 |
| Example 1-3 | Silicon oxide particles (A1)/Carbon material (B3) | 0.080 |
| Comparative Example 1-1 | Silicon oxide particles (A1)/Carbon material (b1) | 0.26 |
| Comparative Example 1-2 | Silicon oxide particles (A1)/Carbon material (b2) | 45 |
| Comparative Example 1-3 | Silicon oxide particles (A1)/Carbon material (b3) | 0.62 |
| Comparative Example 1-4 | Silicon oxide particles (a1)/Carbon material (B1) | 0.033 |
| Comparative Example 1-5 | Silicon oxide particles (a1)/Carbon material (B2) | 0.065 |
| Comparative Example 1-6 | Silicon oxide particles (a1)/Carbon material (b1) | 0.25 |
| Comparative Example 1-7 | Silicon oxide particles (a1)/Carbon material (b2) | 32 |
| Comparative Example 1-8 | Silicon oxide particles (a1)/Carbon material (b3) | 0.63 |

* Volume resistivity at a powder density of 1.1 g/cm³

TABLE 4

|  | d50 (μm) | d90 (μm) | d10 (μm) | Specific surface area (m²/g) |
|---|---|---|---|---|
| Example 1-1 | 12.1 | 20.9 | 6.7 | 3.5 |
| Example 1-2 | 11.2 | 17.7 | 6.7 | 3.0 |
| Example 1-3 | 7.8 | 12.4 | 4.8 | 8.2 |
| Comparative Example 1-1 | 18.4 | 33.9 | 9.0 | 1.9 |
| Comparative Example 1-2 | 17.1 | 29.1 | 6.7 | 1.3 |
| Comparative Example 1-3 | 15.5 | 25.3 | 8.7 | 3.1 |
| Comparative Example 1-4 | 11.8 | 19.8 | 6.8 | 3.6 |
| Comparative Example 1-5 | 11.4 | 18.7 | 6.5 | 3.1 |
| Comparative Example 1-6 | 18.2 | 33.0 | 8.9 | 2.1 |
| Comparative Example 1-7 | 17.1 | 28.3 | 7.1 | 1.4 |
| Comparative Example 1-8 | 15.4 | 25.2 | 8.8 | 3.2 |

The results of evaluating the batteries that were produced using the respective negative electrode materials obtained in Examples 1-1 to 1-3 and Comparative Examples 1-1 to 1-8 are summarized in Tables 5 to 7.

TABLE 5

|  | Carbon material | Silicon oxide particles | First charge capacity (mAh/g) | First discharge capacity (mAh/g) | First efficiency (%) |
|---|---|---|---|---|---|
| Example 1-1 | B1 | A1 | 563 | 423 | 75.1 |
| Example 1-2 | B2 | A1 | 547 | 396 | 72.4 |
| Example 1-3 | B3 | A1 | 577 | 423 | 73.3 |
| Comparative Example 1-6 | b1 | a1 | 575 | 383 | 66.7 |

TABLE 5-continued

|  | Carbon material | Silicon oxide particles | First charge capacity (mAh/g) | First discharge capacity (mAh/g) | First efficiency (%) |
|---|---|---|---|---|---|
| Comparative Example 1-7 | b2 | a1 | 558 | 373 | 66.8 |
| Comparative Example 1-8 | b3 | a1 | 581 | 401 | 69.1 |

TABLE 6

|  | Carbon material | Silicon oxide particles | First charge capacity (mAh/g) | First discharge capacity (mAh/g) | First efficiency (%) |
|---|---|---|---|---|---|
| Comparative Example 1-1 | b1 | A1 | 604 | 387 | 64.0 |
| Comparative Example 1-2 | b2 | A1 | 539 | 365 | 67.7 |
| Comparative Example 1-3 | b3 | A1 | 551 | 378 | 68.6 |
| Comparative Example 1-6 | b1 | a1 | 575 | 383 | 66.7 |
| Comparative Example 1-7 | b2 | a1 | 558 | 373 | 66.8 |
| Comparative Example 1-8 | b3 | a1 | 581 | 401 | 69.1 |

TABLE 7

|  | Carbon material | Silicon oxide particles | First charge capacity (mAh/g) | First discharge capacity (mAh/g) | First efficiency (%) |
|---|---|---|---|---|---|
| Comparative Example 1-4 | B1 | a1 | 578 | 416 | 71.9 |
| Comparative Example 1-5 | B2 | a1 | 568 | 399 | 70.3 |
| Comparative Example 1-6 | b1 | a1 | 575 | 383 | 66.7 |
| Comparative Example 1-7 | b1 | a1 | 558 | 373 | 66.8 |

Comparative Examples 1-6 to 1-8 are negative electrode materials each obtained by mixing a carbon material not satisfying the volume resistivity of less than 0.14 Ω·cm at a powder density of 1.1 g/cm³ with silicon oxide particles not containing any microcrystal of zero-valent silicon atoms. Comparative Example 1-1 to 1-3 are negative electrode materials obtained by mixing a carbon material not satisfying the volume resistivity of less than 0.14 Ω·cm at a powder density of 1.1 g/cm³ with silicon oxide particles containing microcrystals of zero-valent silicon atoms.

From Table 6, it is seen that, even when a carbon material not satisfying the volume resistivity of less than 0.14 Ω·cm at a powder density of 1.1 g/cm³ is mixed with silicon oxide particles containing microcrystals of zero-valent silicon atoms, the first discharge capacity and the first efficiency are not improved, or the improvement was limited if any.

Comparative Examples 1-4 and 1-5 are negative electrode materials each obtained by mixing a carbon material having a volume resistivity of less than 0.14 Ω·cm at a powder density of 1.1 g/cm³ with silicon oxide particles not containing any microcrystal of zero-valent silicon atoms.

From Table 7, it is seen that, although the first discharge capacity and the first efficiency are improved by mixing a carbon material having a volume resistivity of less than 0.14

Ω·cm at a powder density of 1.1 g/cm³ with silicon oxide particles not containing any microcrystal of zero-valent silicon atoms, the improvement is not large.

Examples 1-1 to 1-3 are negative electrode materials each obtained by mixing a carbon material having a volume resistivity of less than 0.14 Ω·cm at a powder density of 1.1 g/cm³ with silicon oxide particles containing microcrystals of zero-valent silicon atoms.

From Table 5, it is seen that the first discharge capacity and the first efficiency are both largely improved by mixing a carbon material having a volume resistivity of less than 0.14 O·cm at a powder density of 1.1 g/cm³ with silicon oxide particles containing microcrystals of zero-valent silicon atoms.

Reference Examples 1-1 to 1-5

The first discharge capacity and the initial efficiency were measured using the respective carbon materials singly, and the results thereof are summarized in Table 8. The battery production and the evaluations of the first discharge capacity and initial efficiency were performed as follows.
<Production of Battery II for Performance Evaluation>
Using a hybridization mixer, a slurry was prepared by kneading 97.5% by weight of each carbon material shown in Table 8 along with 1% by weight of carboxymethyl cellulose (CMC) as a binder and 3.1% by weight of a 48%-by-weight aqueous dispersion of styrene-butadiene rubber (SBR). A 18 µm-thick copper foil was coated with this slurry by a blade method such that a basis weight of 12 mg/cm¹ was attained, and this copper foil was subsequently dried.

Thereafter, a negative electrode sheet was obtained by roll-pressing the copper foil such that a negative electrode active substance layer having a density of 1.5 g/cm³ was formed, and a circular piece of 12.5 mm in diameter was punched out from the thus obtained negative electrode sheet and subsequently vacuum-dried at 110° C. for 12 hours, whereby a negative electrode for evaluation was produced.
<Production of Nonaqueous Secondary Battery (Coin-Type Battery)>
The electrode sheet prepared by the above-described method was used as a negative electrode for evaluation, and a lithium metal foil punched out in a disk shape of 15 mm in diameter was used as a counter electrode. Between these electrodes, a separator (made of a porous polyethylene film), which had been impregnated with an electrolyte solution obtained by dissolving $LiPF_6$ in a mixed solvent of ethylene carbonate and ethyl methyl carbonate (volume ratio=3:7) at a concentration of 1 mol/L, was arranged, whereby a coin-type battery II for performance evaluation was produced.
<Discharge Capacity, Charge Capacity, and Efficiency>
Using the nonaqueous secondary battery (coin-type battery) produced by the above-described method, the charge capacity (mAh/g) and the discharge capacity (mAh/g) during charging and discharging of the battery were measured in accordance with the following measurement method.

The lithium counter electrode was charged to 5 mV at a current density of 0.05 C and further charged to a current density of 0.005 C at a constant voltage of 5 mV. After the negative electrode was doped with lithium, the lithium counter electrode was discharged to 1.5 V at a current density of 0.1 C.

The charge capacity and the discharge capacity were determined as follows. The weight of the copper foil punched out to have the same area as the negative electrode was subtracted from the weight of the negative electrode, and the thus obtained value was multiplied by a coefficient determined from the composition ratio of the negative electrode active substance and the binder so as to determine the weight of the negative electrode active substance. The charge capacity and the discharge capacity in the first cycle were divided by the weight of the negative electrode active substance, whereby the charge capacity per weight and the discharge capacity per weight were determined, respectively.

The thus determined charge capacity (mAh/g) and discharge capacity (mAh/g) were defined as "first charge capacity" (mAh/g) and "first discharge capacity" (mAh/g) of the negative electrode material, respectively.

Further, a value obtained by dividing the discharge capacity (mAh/g) measured in the first cycle by the charge capacity (mAh/g) measured in the first cycle and then multiplying this value by 100 was defined as "first efficiency" (%)

TABLE 8

| | Carbon material | Volume resistivity (Ω · m) * | First discharge capacity (mAh/g) | First efficiency (%) |
|---|---|---|---|---|
| Reference Example 1-1 | B2 | 0.044 | 358 | 91.4 |
| Reference Example 1-2 | B3 | 0.059 | 361 | 89.0 |
| Reference Example 1-3 | b1 | 0.14 | 352 | 96.6 |
| Reference Example 1-4 | b2 | 26 | 363 | 64.2 |
| Reference Example 1-5 | b3 | 0.40 | 348 | 96.9 |

As seen from Table 8, in those cases where the carbon materials (B2) and (B3) used in the above-described Examples were each used alone, the evaluation results of the charge-discharge efficiency was poor as compared to those cases where the carbon materials (b1), (b2) and (b3) used in the above-described Comparative Examples were each used alone. In other words, it is seen that the effect of improving the charge-discharge efficiency in the present invention is difficult to predict from the evaluation results of individual carbon material (B), and that this effect was discovered only after evaluating each carbon material (B) in combination with the silicon oxide particles (A).
<Production of Battery III for Performance Evaluation>
<Production of Negative Electrode>
Using a hybridization mixer, a slurry was prepared by kneading 97.5% by weight of a mixture of carbon materials and silicon oxide particles (weight ratio=9:1) along with 1% by weight of carboxymethyl cellulose (CMC) as a binder and 3.1% by weight of a 48%-by-weight aqueous dispersion of styrene-butadiene rubber (SBR). A 20 µm-thick copper foil was coated with this slurry by a blade method such that a basis weight of 4 to 5 mg/cm² was attained, and this copper foil was subsequently dried.

Thereafter, a negative electrode sheet was obtained by roll-pressing the copper foil such that a negative electrode active substance layer having a density of 1.2 to 1.4 g/cm³ was formed, and a circular piece of 12.5 mm in diameter was punched out from the thus obtained negative electrode sheet and subsequently vacuum-dried at 90° C. for 8 hours, whereby a negative electrode for evaluation was produced.
<Production of Positive Electrode>
Using a disperser, a slurry was prepared by mixing 97% by mass of lithium cobalt oxide ($LiCoO_2$) as a positive electrode active substance, 1.5% by mass of acetylene black as a conductive material and 1.5% by mass of polyvinylidene fluoride (PVdF) as a binder in an N-methylpyrrolidone solvent. Both sides of a 21 μm-thick aluminum foil were uniformly coated with this slurry such that a basis weight of 23 mg/cm² was attained, and this aluminum foil was subsequently dried and then pressed to obtain a positive electrode sheet.

Thereafter, a circular piece of 12.5 mm in diameter was punched out from the thus obtained positive electrode sheet and subsequently vacuum-dried at 90° C. for 8 hours, whereby a positive electrode for evaluation was produced.

<Production of Electrolyte Solution>

Under a dry argon atmosphere, dried $LiPF_6$ was dissolved at a ratio of 1.0 mol/L in a mixture of ethylene carbonate and ethyl methyl carbonate (volume ratio=3:7) to prepare an electrolyte solution (E1). To this electrolyte solution (E1), lithium difluorophosphate was mixed at a ratio of 0.50% by mass, whereby an electrolyte solution (E2) was obtained.

<Production of Nonaqueous Secondary Battery (Coin-Type Battery)>

The electrode sheets prepared by the above-described method were used as a negative electrode and a positive electrode for evaluation and, between these electrodes, a separator (made of a porous polyethylene film) which had been impregnated with the above-described electrolyte solutions E1 and E2 was arranged, whereby a coin-type battery III for performance evaluation was produced.

<Over-Discharge Characteristic>

Using the nonaqueous secondary battery (coin-type battery) produced by the above-described method, the efficiency improvement degree was measured by the following measurement method.

The battery was charged for 10 hours at a current density of 0.05 C and then discharged to 3.0 V at a current density of 0.1 C. This process was repeated for a total of twice, and the battery was subsequently charged for 10 hours at a current density of 0.05 C and then discharged to 3.0 V at a current density of 0.1 C, after which the battery was discharged at a constant voltage for 2 hours such that the battery maintained 3.0 V.

Thereafter, this lithium ion battery was stored at 60° C. for 52 hours, and the open-circuit voltage (OCV) was measured to determine the over-discharge characteristic.

Reference Example 2-1

The over-discharge characteristic was measured using A1, B1 and E2 as the above-described silicon oxide particles, carbon material and electrolyte solution, respectively. The results thereof are shown in Table 9.

Reference Example 2-2

The over-discharge characteristic was measured using A1, B1 and E1 as the above-described silicon oxide particles, carbon material and electrolyte solution, respectively. The results thereof are shown in Table 9.

Reference Example 2-3

The over-discharge characteristic was measured using a1, B1 and E2 as the above-described silicon oxide particles, carbon material and electrolyte solution, respectively. The results thereof are shown in Table 9.

Reference Example 2-4

The over-discharge characteristic was measured using a1, B1 and E1 as the above-described silicon oxide particles, carbon material and electrolyte solution, respectively. The results thereof are shown in Table 9.

TABLE 9

|  | Silicon oxide particles | Carbon material | Electrolyte solution | Over-discharge characteristic (V) |
|---|---|---|---|---|
| Reference Example 2-1 | A1 | B1 | E2 | 2.883 |
| Reference Example 2-2 | A1 | B1 | E1 | 2.833 |
| Reference Example 2-3 | a1 | B1 | E2 | 2.643 |
| Reference Example 2-4 | a1 | B1 | E1 | 2.818 |

From Table 9, the followings are seen.

1) From a comparison between Reference Examples 2-1 and 2-3 and a comparison between Reference Examples 2-2 and 2-4, it is seen that the effect of suppressing a reduction in OCV was further enhanced and the over-discharge characteristic was further improved in both cases where silicon oxide particles corresponding to the silicon oxide particles (A) were used.

2) It is seen that the effect of suppressing a reduction in OCV was most enhanced and the highest effect of improving the over-discharge characteristic was attained in Reference Example 2-1. In other words, it is seen that the most favorable over-discharge characteristic was obtained when silicon oxide particles corresponding to the silicon oxide particles (A) were used along with an electrolyte solution containing lithium difluorophosphate.

What is claimed is:

1. A negative electrode material for nonaqueous secondary batteries, the negative electrode material comprising silicon oxide particles (A) and a carbon material (B),
wherein
the silicon oxide particles (A) comprise zero-valent silicon atoms,
the carbon material (B) has a volume resistivity of less than 0.14 Ω·cm at a powder density of 1.1 g/cm³,
wherein the carbon material (B) has a specific surface area of 10 m²/g or smaller as determined by a BET method.

2. The negative electrode material for nonaqueous secondary batteries according to claim 1, comprising silicon microcrystals in the silicon oxide particles (A).

3. The negative electrode material for nonaqueous secondary batteries according to claim 1, wherein the 10% cumulative particle size from the smaller particle side (d10) of the silicon oxide particles (A) is 0.001 μm to 6 μm.

4. The negative electrode material for nonaqueous secondary batteries according to claim 1, wherein the carbon material (B) is a composite carbon material obtained by making a spheroidized graphite and a carbonaceous material into a composite.

5. The negative electrode material for nonaqueous secondary batteries according to claim 1, wherein the silicon oxide particles (A) have an average particle size (d50) of 0.01 μm to 20 μm.

6. A negative electrode for nonaqueous secondary batteries, the negative electrode comprising:
a current collector; and
an active substance layer formed on the current collector, wherein the active substance layer comprises the negative electrode material for nonaqueous secondary batteries according to claim 1.

7. A nonaqueous secondary battery comprising:
a positive electrode;
a negative electrode; and
an electrolyte,
wherein the negative electrode is the negative electrode for nonaqueous secondary batteries according to claim 6.

8. The nonaqueous secondary battery according to claim 7, wherein the electrolyte is an electrolyte solution contained in a nonaqueous solvent.

9. The nonaqueous secondary battery according to claim 8, wherein the electrolyte solution contains lithium difluorophosphate, and the content thereof is 0.01% by weight to 2% by weight with respect to the whole electrolyte solution.

10. The negative electrode material for nonaqueous secondary batteries according to claim 2, wherein the particle size of silicon microcrystals is 1 to 500 nm.

11. The negative electrode material for nonaqueous secondary batteries according to claim 2, wherein the particle size of silicon microcrystals is 2 to 20 nm.

12. The negative electrode material for nonaqueous secondary batteries according to claim 1, wherein the carbon material (B) has a specific surface area of 5 $m^2/g$ or smaller as determined by a BET method.

* * * * *

UNITED STATES PATENT AND TRADEMARK OFFICE
CERTIFICATE OF CORRECTION

| | |
|---|---|
| PATENT NO. | : 11,183,679 B2 |
| APPLICATION NO. | : 16/419713 |
| DATED | : November 23, 2021 |
| INVENTOR(S) | : Nobuyuki Ishiwatari et al. |

It is certified that error appears in the above-identified patent and that said Letters Patent is hereby corrected as shown below:

In the Specification

Column 34, TABLE 8, Line 31, under First efficiency %, "64.2" should read -- 94.2 --.

Signed and Sealed this
Third Day of May, 2022

Katherine Kelly Vidal
*Director of the United States Patent and Trademark Office*